US008147710B2

(12) United States Patent
Nappa et al.

(10) Patent No.: US 8,147,710 B2
(45) Date of Patent: Apr. 3, 2012

(54) COMPOSITIONS COMPRISING 2,3,3,3-TETRAFLUOROPROPENE, 2-CHLORO-2,3,3,3-TETRAFLUOROPROPANOL, 2-CHLORO-2,3,3,3-TETRAFLUORO-PROPYL ACETATE OR ZINC (2-CHLORO-2,3,3,3-TETRAFLUOROPROPOXY) CHLORIDE

(75) Inventors: Mario Joseph Nappa, Newark, DE (US); Xuehui Sun, Swedesboro, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/576,388

(22) Filed: Oct. 9, 2009

(65) Prior Publication Data

US 2010/0090156 A1    Apr. 15, 2010

Related U.S. Application Data

(60) Provisional application No. 61/104,334, filed on Oct. 10, 2008.

(51) Int. Cl.
*C09K 5/04* (2006.01)
(52) U.S. Cl. .......................................... 252/67; 510/175
(58) Field of Classification Search ................ 252/67; 510/175
See application file for complete search history.

(56) References Cited

U.S. PATENT DOCUMENTS

| | | | |
|---|---|---|---|
| 2,970,988 A | 2/1961 | Lo | |
| 5,595,661 A * | 1/1997 | Li et al. | 210/634 |
| 7,279,451 B2 * | 10/2007 | Singh et al. | 510/412 |
| 7,641,809 B2 | 1/2010 | Leck et al. | |
| 2004/0256594 A1* | 12/2004 | Singh et al. | 252/71 |
| 2005/0211949 A1 | 9/2005 | Bivens et al. | |
| 2006/0243945 A1 | 11/2006 | Minor et al. | |
| 2006/0258891 A1 | 11/2006 | Mukhopadhyay et al. | |
| 2007/0112227 A1 | 5/2007 | Mukhopadhyay et al. | |
| 2009/0143604 A1 | 6/2009 | Nappa et al. | |
| 2009/0278075 A1 | 11/2009 | Mahler et al. | |
| 2011/0031436 A1 | 2/2011 | Mahler et al. | |

FOREIGN PATENT DOCUMENTS

| | | | |
|---|---|---|---|
| EP | 164954 | * | 12/1985 |
| EP | 2 078 709 A1 | | 7/2009 |
| WO | 02/079129 A2 | | 10/2002 |
| WO | 2005/090271 A2 | | 9/2005 |
| WO | 2008/002499 A2 | | 1/2008 |
| WO | 2008/030439 A2 | | 3/2008 |
| WO | 2008/030440 A2 | | 3/2008 |
| WO | 2008/053811 A1 | | 5/2008 |
| WO | 2008/054780 A2 | | 5/2008 |
| WO | 2008/075017 A2 | | 6/2008 |
| WO | 2008/079986 A1 | | 7/2008 |
| WO | 2009/067571 A1 | | 5/2009 |
| WO | 2009/067720 A2 | | 5/2009 |

OTHER PUBLICATIONS

PCT Partial International Search Report, dated Feb. 17, 2010.
PCT International Search Report and Written Opinion, dated May 26, 2010.
Brown et al., Radiation-Induced Polymerization at High Pressure of 2,3,3,3-Tetrafluoropropene in Bulk with Tetrafluoroethylene, Journal of Polymer Science: Part A-1, vol. 9, 1971, pp. 1993-2007.
Dickson et al., Fluorocarbon-Aluminum Compounds, III. Reactions of Heptafluoro-3-lodopropane, 1,1,1,2,2-Pentafluoro-3-lodopropane, and Heptafluoro-2-lodopropane with Lithium Tetrahydroaluminate, Australian Journal of Chemistry, CSIRO, AU, vol. 25, Jan. 1, 1972, pp. 761-768.
Montanari et al., A Novel Synthesis of Perhalogenated Alkenes, J. Org. Chemistry, vol. 57, 1992, pp. 5018-5019.
Paleta et al., The Chemo-Selective Reduction of Fluorinated Halogenoesters with Sodium Borohydride. Fluorinated Halogenoalkanols and Their (Meth)Acrylates, Journal of Fluorine Chemistry, vol. 45, 1989, pp. 331-348.

* cited by examiner

*Primary Examiner* — John Hardee

(57) ABSTRACT

Compositions comprising $CF_3CClFCH_2OH$, $CF_3CClFCH_2OZnCl$, and $CF_3CClFCH_2OC(=O)CH_3$ are useful in processes to make HFO-1234yf. Compositions comprising HFO-1234yf may comprise at least one additional compound selected from the group consisting of CFC-114a (2-dichloro-1,1,1,2-tetrafluoroethane, $CCl_2FCF_3$), HCFC-124 (2-chloro-1,1,1,2-tetrafluoroethane, $CF_3CHFCl$), HCFC-143a (1,1,1-trifluoroethane, $CF_3CH_3$), CFO-1113 (2-chloro-1,1,2-trifluoroethene, $CClF=CF_2$), HFO-1123 (1,1,2-trifluoroethene, $CHF=CF_2$), HFO-1132a (1,1-difluoroethene, $CH_2=CF_2$), TFE (tetrafluoroethene, $CF_2=CF_2$), HCFO-1122 (2-chloro-1,1-difluoroethene, $CHCl=CF_2$), 3,4,4,4-tetrafluoro-2-butanone ($CH_3C(=O)CHFCF_3$), acetyl fluoride ($CH_3C(=O)F$), 2-chloro-2,3,3,3-tetrafluoropropanol ($CF_3CClFCH_2OH$), 2-chloro-2,3,3,3-tetrafluoropropyl acetate ($CF_3CClFCH_2OC(=O)CH_3$), Zinc (2-chloro-2,3,3,3-tetrafluoropropoxy) chloride ($CF_3CClFCH_2OZnCl$2-chloro-2,3,3,3-tetrafluoropropoxy) methyl acetate ($CF_3CFClCH_2OCH_2OC(=O)CH_3$), 1,3-bistrifluoromethyl-1,3-difluorocyclobutane ($C_6H_4F_8$), 2,3,3,3-tetrafluoropropyl acetate ($CF_3CHFCH_2OC(=O)CH_3$), dimethylformamide (DMF, $HCON(CH_3)_2$), pyridine ($C_5H_5N$), ethyl acetate, ($CHClFCF_3$), acetic acid ($CH_3C(=O)OH$), diethyl ether ($CH_3CH_2OCH_2CH_3$), acetic anhydride ($CH_3C(=O)OC(=O)CH_3$), methyl acetate ($CH_3C(=O)OCH_3$), dimethylacetamide ($CH_3C(=O)N(CH_3)_2$), methanol ($CH_3OH$), ethanol CH3CH2OH), methyl formate ($HC(=O)OCH_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof. Compositions comprising HFO-1234yf are useful, among other uses, as heat transfer compositions for use in refrigeration, air-conditioning and heat pump systems.

22 Claims, 1 Drawing Sheet

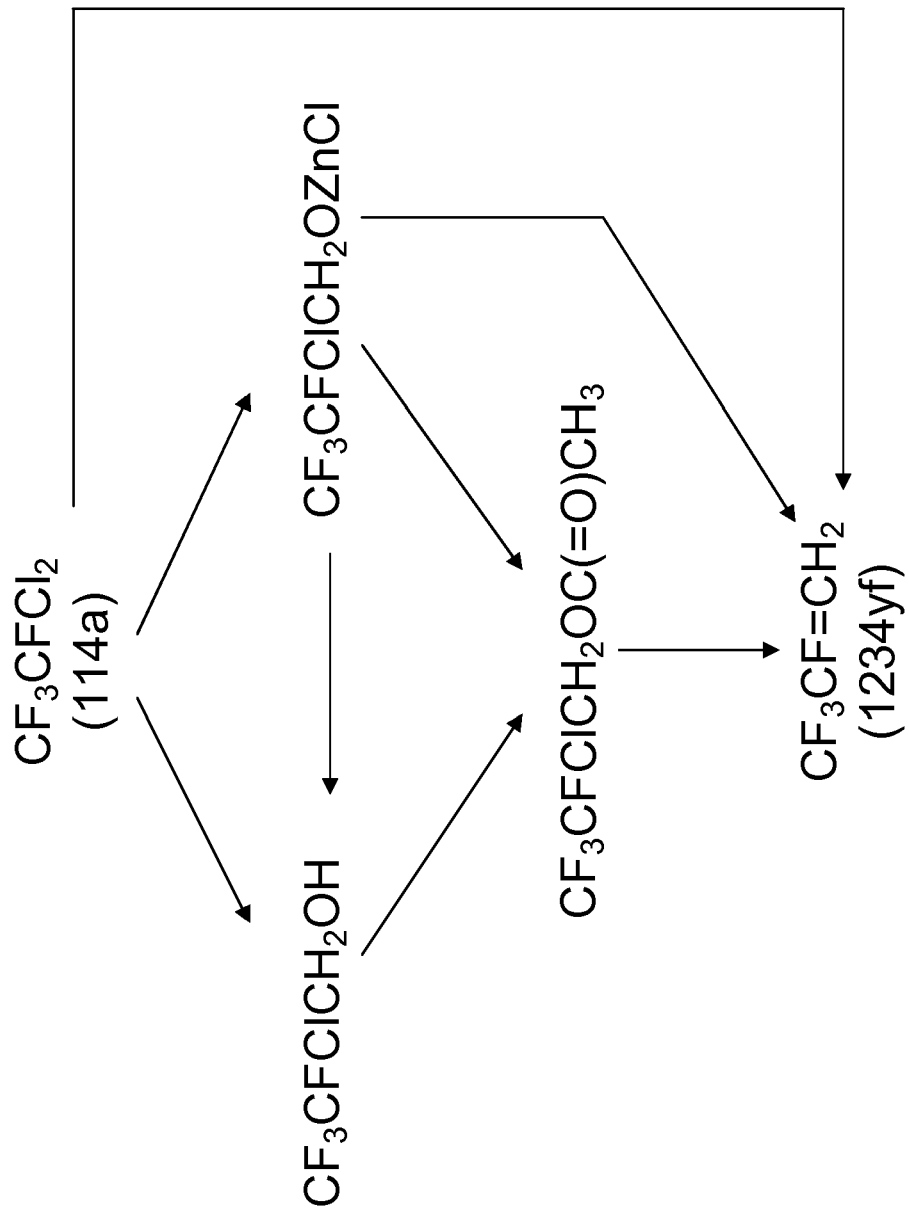

COMPOSITIONS COMPRISING 2,3,3,3-TETRAFLUOROPROPENE, 2-CHLORO-2,3,3,3-TETRAFLUOROPROPANOL, 2-CHLORO-2,3,3,3-TETRAFLUORO-PROPYL ACETATE OR ZINC (2-CHLORO-2,3,3,3-TETRAFLUOROPROPOXY) CHLORIDE

CROSS REFERENCE TO RELATED APPLICATIONS

This application claims the priority benefit of U.S. Provisional Application 61/104,334, filed Oct. 10, 2008.

BACKGROUND

1. Field of the Disclosure

The present disclosure relates to the field of compositions which may be useful as heat transfer compositions, aerosol propellants, foaming agents, blowing agents, solvents, cleaning agents, carrier fluids, displacement drying agents, buffing abrasion agents, polymerization media, expansion agents for polyolefins and polyurethane, gaseous dielectrics, extinguishing agents, and fire suppression agents, all of which may be in liquid or gaseous form. In particular, the present disclosure relates to compositions that may be useful as heat transfer compositions, such as 2,3,3,3-tetrafluoropropene (HFO-1234yf, or 1234yf). Additionally, the present disclosure relates to compositions comprising 2-chloro-2,3,3,3-tetrafluoropropanol, 2-chloro-2,3,3,3-tetrafluoropropyl acetate or zinc (2-chloro-2,3,3,3-tetrafluoropropoxy) chloride.

These additional compositions are useful in processes to make HFO-1234yf.

2. Description of Related Art

New environmental regulations have led to the need for new compositions for use in refrigeration, air-conditioning and heat pump apparatus. Low global warming potential compounds are of particular interest.

SUMMARY OF THE INVENTION

Applicants have found that in preparing such new low global warming potential compounds, such as HFO-1234yf, that certain additional compounds are present in small amounts.

Therefore, in accordance with the present invention, in one embodiment there is provided a composition comprising HFO-1234yf and at least one additional compound selected from the group consisting of CFC-114a (2-dichloro-1,1,1,2-tetrafluoroethane, $CCl_2FCF_3$), HCFC-124 (2-chloro-1,1,1,2-tetrafluoroethane, $CF_3CHFCl$), HFC-143a (1,1,1-trifluoroethane, $CF_3CH_3$), CFO-1113 (2-chloro-1,1,2-trifluoroethene, $CClF=CF_2$), HFO-1123 (1,1,2-trifluoroethene, $CHF=CF_2$), HFO-1132a (1,1-difluoroethene, $CH_2=CF_2$), TFE (tetrafluoroethene, $CF_2=CF_2$), HCFO-1122 (2-chloro-1,1-difluoroethene, $CHCl=CF_2$), 3,4,4,4-tetrafluoro-2-butanone ($CH_3C(=O)CHFCF_3$), acetyl fluoride ($CH_3C(=O)F$), 2-chloro-2,3,3,3-tetrafluoropropanol ($CF_3CClFCH_2OH$), 2-chloro-2,3,3,3-tetrafluoropropyl acetate ($CF_3CClFCH_2OC(=O)CH_3$), zinc (2-chloro-2,3,3,3-tetrafluoropropoxy) chloride ($CF_3CClFCH_2OZnCl$), 2-chloro-2,3,3,3-tetrafluoropropoxy methyl acetate ($CF_3CFClCH_2OCH_2C(=O)CH_3$), 1,3-bistrifluoromethyl-1,3-difluorocyclobutane ($C_6H_4F_8$), 2,3,3,3-tetrafluoropropyl acetate ($CF_3CHFCH_2C(=O)CH_3$), dimethylformamide (DMF, $HCON(CH_3)_2$), pyridine ($C_5H_5N$), ethyl acetate, ($CHClFCF_3$), acetic acid ($CH_3C(=O)OH$), diethyl ether ($CH_3CH_2OCH_2CH_3$), acetic anhydride ($CH_3C(=O)OC(=O)CH_3$), methyl acetate ($CH_3C(=O)OCH_3$), dimethylacetamide ($CH_3C(=O)N(CH_3)_2$), methanol ($CH_3OH$), ethanol $CH3CH2OH$), methyl formate ($HC(=O)OCH_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof, meaning mixtures of any of the foregoing additional compounds listed in this paragraph.

In another embodiment is provided a composition comprising 2-chloro-3,3,3-trifluoropropanol ($CF_3CClFCH_2OH$), at least one solvent, and optionally at least one additional compound.

In another embodiment is provided a composition comprising 2-chloro-2,3,3,3-tetrafluoropropyl acetate ($CF_3CClFCH_2OC(=O)CH_3$), at least one solvent, and optionally at least one additional compound.

In another embodiment, is provided a composition comprising zinc (2-chloro-2,3,3,3-tetrafluoropropoxy) chloride ($CF_3CClFCH_2OZnCl$), at least one solvent, and optionally at least one additional compound.

BRIEF DESCRIPTION OF THE DRAWINGS

FIG. 1 is a schematic drawing showing different reactions for producing HFO-1234yf from CFC-114a.

DETAILED DESCRIPTION

Compositions

A process for making 2,3,3,3-tetrafluoropropene (HFO-1234yf, $CF_3CF=CH_2$) from CFC-114a (or just 114a or $CF_3CFCl_2$) is shown in FIG. 1. As can be seen from FIG. 1, $CF_3CClFCH_2OH$, $CF_3CClFCH_2OC(=O)CH_3$ and $CF_3CClFCH_2OZnCl$ are intermediate compounds which may be formed in this process.

Referring to FIG. 1, in one embodiment, CFC-114a may be reacted to form $CF_3CFClCH_2OH$, by treatment with activated zinc powder and paraformaldehyde. This reaction may be carried out in the liquid phase in the presence of a solvent. $CF_3CFClCH_2OH$ may be reacted with a carboxylic acid anhydride (e.g. acetic anhydride) and a reactive metal (e.g. zinc) to form $CF_3CClFCH_2OC(=O)CH_3$, which may further be reacted in solvent with a reactive metal, such as zinc, to produce HFO-1234yf. In one particular embodiment, the solvent may be a mixed solvent, such as DMF (dimethylformamide) and pyridine. However, it should be noted that the present invention is not limited to the use of these particular solvents, and a variety of solvents, such as those listed below, infra, will work with the present invention.

Alternatively, in another embodiment, as shown in FIG. 1, CFC-114a may be reacted with a reactive metal and an aldehyde to form $CF_3CFClCH_2OZnCl$. This reaction may also be carried out in the liquid phase in the presence of a solvent. Again, in one particular embodiment, the solvent may be a mixed solvent, such as DMF (dimethylformamide) and pyridine, it being noted that a variety of solvents, such as those listed below, infra, will work with the present invention. $CF_3CFClCH_2OZnCl$ may be further reacted with a carboxylic acid anhydride (e.g. acetic anhydride) and a reactive metal (e.g., zinc) to form $CF_3CClFCH_2OC(=O)CH_3$, which may further be reacted in solvent with a reactive metal, such as zinc, to produce HFO-1234yf. In yet another embodiment, all of the above mentioned reactions may be carried out in multiple steps in a single reaction vessel wherein none of the intermediate compounds are isolated. This is indicated in FIG. 1 as a single arrow from CFC-114a to HFO-1234yf.

2,3,3,3-tetrafluoropropene (HFO-1234yf, $CF_3CF=CH_2$), 2-chloro-2,3,3,3-tetrafluoropropanol ($CF_3CClFCH_2OH$), 2-chloro-2,3,3,3-tetrafluoropropyl acetate ($CF_3CClFCH_2OC(=O)CH_3$), and zinc (2-chloro-2,3,3,3-tetrafluoropropoxy) chloride ($CF_3CClFCH_2OZnCl$) may be prepared as described herein.

In one embodiment, the composition of the present invention comprises HFO-1234yf and at least one additional compound selected from the group consisting of CFC-114a (2-dichloro-1,1,1,2-tetrafluoroethane, $CCl_2FCF_3$), shown in FIG. 1, HCFC-124 (2-chloro-1,1,1,2-tetrafluoroethane, $CF_3CHFCl$), HFC-143a (1,1,1-trifluoroethane, $CF_3CH_3$), CFO-1113 (2-chloro-1,2-trifluoroethene, $CClF=CF_2$), HFO-1123 (1,1,2-trifluoroethene, $CHF=CF_2$), HFO-1132a (1,1-difluoroethene, $CH_2=CF_2$), TFE (tetrafluoroethene, $CF_2=CF_2$), HCFO-1122 (2-chloro-1,1-difluoroethene, $CHCl=CF_2$), 3,4,4,4-tetrafluoro-2-butanone ($CH_3C(=O)CHFCF_3$), acetyl fluoride ($CH_3C(=O)F$), 2-chloro-2,3,3,3-tetrafluoropropanol ($CF_3CClFCH_2OH$), shown in FIG. 1, 2-chloro-2,3,3,3-tetrafluoropropyl acetate ($CF_3CClFCH_2OC(=O)CH_3$), shown in FIG. 1, zinc (2-chloro-2,3,3,3-tetrafluoropropoxy) chloride ($CF_3CClFCH_2OZnCl$), shown in FIG. 1, 2-chloro-2,3,3,3-tetrafluoropropoxy methyl acetate ($CF_3CFClCH_2OCH_2C(=O)CH_3$), 1,3-bistrifluoromethyl-1,3-difluorocyclobutane ($C_6H_4F_8$), 2,3,3,3-tetrafluoropropyl acetate ($CF_3CHFCH_2C(=O)CH_3$), dimethylformamide (DMF, $HCON(CH_3)_2$), pyridine ($C_5H_5N$), ethyl acetate, ($CHClFCF_3$), acetic acid ($CH_3C(=O)OH$), diethyl ether ($CH_3CH_2OCH_2CH_3$), acetic anhydride ($CH_3C(=O)OC(=O)CH_3$), methyl acetate ($CH_3C(=O)OCH_3$), dimethylacetamide ($CH_3C(=O)N(CH_3)_2$), methanol ($CH_3OH$), ethanol $CH_3CH_2OH$), methyl formate ($HC(=O)OCH_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof, meaning mixtures of any of the foregoing additional compounds listed in this paragraph. Any of the compositions of this embodiment as set forth in this paragraph will be referred to hereinafter as Composition A. These compositions can be either vapor phase or liquid phase compositions.

FIG. 1 is a representative illustration of the process for making the compositions of the present invention, and not all of the additional compounds listed in the paragraph above are shown in FIG. 1, it being understood that the composition of the present invention may include all of these additional compounds. The additional compounds listed here as potentially being in the composition comprising HFO-1234yf may be present in the starting materials or the solvent, or these additional compounds may be the reaction products of such additional compounds which are present in the starting materials, produced under the conditions of the reactions to make the HFO-1234yf.

The reaction chemistry described herein and illustrated in FIG. 1 produces HFO-1234yf containing no detectable HFO-1234ze (1,3,3,3-tetrafluoropropene), i.e., it is "essentially free" of HFO-1234ze. By "essentially free of" is meant that the amount of HFO-1234ze present is essentially zero. The ability to detect the presence of any component depends upon the analytical method used and various other factors. In one embodiment, essentially free of HFO-1234ze means that the composition contains less than 10 parts per million (ppm) by weight HFO-1234ze. In another embodiment, essentially free of HFO-1234ze means that the composition contains less than 5 ppm by weight HFO-1234ze. In another embodiment, essentially free of HFO-1234ze means that the composition contains less than 1 ppm by weight HFO-1234ze.

In one embodiment, the total amount of additional compound(s) in the vapor phase of the composition comprising HFO-1234yf ranges from greater than zero weight percent to about 30 weight percent. In another embodiment, the total amount of additional compounds ranges from greater than zero weight percent to about 20 weight percent. In another embodiment, the total amount of additional compound(s) ranges from greater than zero weight percent to about 10 weight percent. In another embodiment, the total amount of additional compound(s) ranges from greater than zero weight percent to about 5 weight percent.

In one embodiment, the total amount of additional compound(s) in the composition comprising HFO-1234yf ranges from greater than zero weight percent to less than 1 weight percent.

In some embodiments, certain precursor compounds to HFO-1234yf contain impurities that appear as the additional compounds in the HFO-1234yf compositions. In other embodiments, the additional compounds are formed by reaction of these precursor impurities. In other embodiments, the reaction conditions under which the HFO-1234yf is produced also produce by-products that then appear as the additional compounds in the HFO-1234yf compositions, by which is meant alternative reaction pathways may produce additional compounds depending upon the particular conditions under which the HFO-1234yf is produced.

In another particular embodiment, the composition of the present invention comprises HFO-1234yf and the following additional compounds: tetrafluoroethene, 1,1-difluoroethene, trifluoroethene, and 2-chloro-1,1,1,2-tetrafluoroethane (HCFC-124). A representative amount of impurities for this embodiment is about 80 weight % 1234yf, about 10 weight % HCFC-124 and the remainder being the tetrafluoroethene, 1,1-difluoroethene, trifluoroethene.

In another particular embodiment, the composition of the present invention comprises HFO-1234yf and the following additional compounds: 2-chloro-2,3,3,3-tetrafluoropropanol ($CF_3CClFCH_2OH$), acetic anhydride, methyl acetate, DMF, and pyridine. In this embodiment, there is greater than 90 weight % 1234yf, about 2 weight % pyridine, and about 1 weight % or less of the remaining additional compounds.

In another particular embodiment, the composition of the present invention comprises HFO-1234yf and the following additional compounds: tetrafluoroethene (TFE), HFO-1123, 1,1,1-trifluoroethane (HFC-143a), CFO-1113, HCFC-124, CFC-114a, 1,3-bis-trifluoromethyl-1,3-difluorocyclobutane, methyl formate, acetic acid, and 2,3,3,3-tetrafluoropropyl acetate. In this embodiment, a representative amount of impurities is about 10 weight % or less of HFO-1123, HCFC-124, and 1,3-bis-trifluoromethyl-1,3-difluorocyclobutane; and less than about 1 weight of the remainder.

In another particular embodiment, the composition of the present invention comprises HFO-1234yf and the following additional compounds: HFO-1123, water, CFO-1113, 1,3-bis-trifluoromethyl-1,3-difluorocyclobutane, methyl formate, and methyl acetate. In this embodiment, a representative amount of impurities is about 1 weight % or less of HFO-1123, water, CFO-1113, 1,3-bis-trifluoromethyl-1,3-difluorocyclobutane, methyl formate, and methyl acetate.

In another embodiment, the present disclosure provides a composition comprising either 1) 2-chloro-2,3,3,3-tetrafluoropropanol ($CF_3CClFCH_2OH$), or 2) $CF_3CClFCH_2OC(=O)CH_3$; or 3) $CF_3CClFCH_2OZnCl$, and each including at least one solvent. The composition comprising 2-chloro-2,3,3,3-tetrafluoropropanol ($CF_3CClFCH_2OH$) and at least one solvent shall be referred to hereinafter as Composition B. The composition comprising 2-chloro-2,3,3,3-tetrafluoropropyl acetate ($CF_3CClFCH_2OC(=O)CH_3$) and at least one solvent shall be referred to hereinafter as Composition C. The composition comprising zinc (2-chloro-2,3,3,3-tetrafluoropropoxy) chloride ($CF_3CClFCH_2OZnCl$) and at least one solvent shall be referred to hereinafter as Composition D.

In one embodiment, the total amount of additional compound(s) in the compositions comprising $CF_3CClFCH_2OH$, $CF_3CClFCH_2OC(=O)CH_3$, or $CF_3CClFCH_2OZnCl$ and at least one solvent ranges from greater than zero weight percent to about 50 weight percent based upon the total composition. In another embodiment, the total amount of additional compounds ranges from greater than zero weight percent to about 30 weight percent. In another embodiment, the total amount of additional compound(s) ranges from greater than zero weight percent to about 10 weight percent. In another embodiment, the total amount of additional compound(s) ranges from greater than zero weight percent to about 5 weight percent. In another embodiment, the total amount of additional compound(s) ranges from greater than zero weight percent to about 1 weight percent.

In some embodiments, certain precursor compounds to $CF_3CClFCH_2OH$, $CF_3CClFCH_2OC(=O)CH_3$, or $CF_3CClFCH_2OZnCl$ contain impurities that appear in the $CF_3CClFCH_2OH$, $CF_3CClFCH_2OC(=O)CH_3$, or $CF_3CClFCH_2OZnCl$. In other embodiments, the additional compounds are formed by reaction of these precursor impurities. In other embodiments, the reaction conditions under which the $CF_3CClFCH_2OH$, $CF_3CClFCH_2OC(=O)CH_3$, or $CF_3CClFCH_2OZnCl$ is produced also produce by-products, by which is meant alternative reaction pathways may produce additional compounds depending upon the particular conditions under which the $CF_3CClFCH_2OH$, $CF_3CClFCH_2OC(=O)CH_3$, or $CF_3CClFCH_2OZnCl$ is produced. For these products as produced by the processes described herein, certain other compounds introduced by way of the solvent used to carry out the chemistry may be present in the compositions or may react to form other compounds that may be present in the compositions as well.

In one embodiment, the solvent is selected from the group consisting of alkyl, dialkyl, and trialkyl linear or cylic amines, N-methylpyrrolidine, N-methylpiperidine, sulfoxides, ethers, pyridine or alkyl-substituted pyridines, pyrazine or pyrimidine, alkyl and aromatic nitriles, hexamethylphosphoramide, and mixtures thereof. In another embodiment, the solvent is selected from the group consisting of trialkylamines, N-methylpyrrolidine, N-methylpiperidine, pyridine, alkyl-substituted pyridines, dimethylformamide, pyrazine or pyrimidine, and mixtures thereof. In another embodiment, the reaction solvent is selected from the group consisting of dimethylformamide, tetrahydrofuran, pyridine, dimethylacetamide, 1,4-dioxane, N-methylpyrrolidone, diethyl ether and mixtures thereof. In another embodiment, the solvent is pyridine or alkyl-substituted pyridines or mixtures thereof. In another embodiment, the solvent is selected from the group consisting of alcohols, esters, and mixtures thereof. In another embodiment, the solvent is selected from the group consisting of methanol, ethanol, methyl formate, dimethyl sulfoxide, acetonitrile, benzonitrile and mixtures thereof, or mixtures of these with any of the aforementioned other solvents.

In one embodiment, the total amount of solvent present in the compositions comprising any of $CF_3CClFCH_2OH$, $CF_3CClFCH_2OZnCl$, or $CF_3CClFCH_2OC(=O)CH_3$, will vary depending upon various factors. If not enough solvent is provided not all of the reactant and/or product compounds will stay in solution. Additionally, if too much solvent is used, the rate of reaction will be slow. In one embodiment, the solvent will be present in an amount of at least about 90 weight percent of the composition. In another embodiment, the solvent will be present in the compositions in an amount of at least 50 weight percent of the composition. In another embodiment, the solvent will be present in the compositions in an amount of at least about 30 weight percent of the composition. In yet another embodiment the solvent will be present in an amount of at least about 20 weight percent.

In another embodiment, the composition comprising $CF_3CClFCH_2OH$ and at least one solvent may further comprise at least one additional compound selected from the group consisting of HFO-1234yf, CFC-114a, HCFC-124, CFO-1113, HFO-1123, HFO-1132a, TFE, HCFO-1122, dimethylacetamide, methanol, methyl acetate, methyl formate, dimethylformamide, pyridine, ethyl acetate, acetic acid, diethyl ether, $CF_3CClFCH_2OZnCl$, $CF_3CClFCH_2OC(=O)CH_3$, 2-chloro-2,3,3,3-tetrafluoropropoxy methyl acetate, and mixtures thereof meaning mixtures of any of the foregoing additional compounds listed in this paragraph. It is noted that not all of the compounds listed here are shown in FIG. 1, since FIG. 1 is meant to be a representative illustration of the processes to make the compositions of the present invention. It is believed that these compounds arise as impurities in the starting materials, impurities in the solvent, or either of these types of impurities that have reacted to form other compounds under the reaction conditions used to produce the $CF_3CClFCH_2OH$. The compositions of this embodiment as described in this paragraph will be referred to hereinafter as Compositions B(1).

In one particular embodiment, the composition comprises 2-chloro-2,3,3,3-tetrafluoropropanol ($CF_3CClFCH_2OH$) and at least one solvent comprising dimethylformamide and further comprises HCFC-124 and methanol as the additional compounds. In this embodiment, the solvent, DMF, may be present at about 80 weight % or higher. The HCFC-124 may be at about 8 weight % or less and the methanol may be less than about 1 weight %.

In another particular embodiment, the composition comprising 2-chloro-2,3,3,3-tetrafluoropropanol ($CF_3CClFCH_2OH$) and at least one solvent comprising pyridine, and further comprises 2-chloro-1,1,1,2-tetrafluoroethane (HCFC-124), methyl formate, chlorotrifluoroethene (CFO-1113), trifluoroethene (HFO-1123) and methanol as the additional compounds. In this embodiment, the pyridine solvent is present at about 80 weight % or more, HCFC-124 is present at about 3 weight % or less and the other additional compounds are each at about 1 weight % or less.

In another particular embodiment, the composition comprising 2-chloro-2,3,3,3-tetrafluoropropanol ($CF_3CClFCH_2OH$) and at least one solvent comprising dimethylacetamide and further comprises 2-chloro-1,1,1,2-tetrafluoroethane (HCFC-124), methyl formate, chlorotrifluoroethene (CFO-1113), and trifluoroethene (HFO-1123), and methanol as the additional compounds. A representative amount of the additional compounds for this embodiment is about 2-3 weight % each of HCFC-124 and CFO-1113 and about 1 weight % or less of the remaining compounds.

In another embodiment, the composition comprising $CF_3CClFCH_2OC(=O)CH_3$ and at least one solvent may further comprise at least one additional compound selected from the group consisting of HFO-1234yf, CFC-114a, HCFC-124, CFO-1113, HFO-1123, HFO-1132a, TFE, HCFO-1122, methanol, methyl acetate, methyl formate, dimethylacetamide, dimethylformamide, pyridine, ethyl acetate, acetic acid, diethyl ether, acetic anhydride, formaldehyde, 3-chloro- 3,4,4,4-trifluoro-2-butanone, 2,3,3,3-tetrafluoropropyl acetate, $CF_3CClFCH_2OCH(=O)$, 2-chloro-2,3,3,3-tetrafluoropropoxy methyl acetate, $CF_3CClFCH_2OH$, $CF_3CClFCH_2OZnCl$, and mixtures thereof, meaning mixtures of any of the foregoing additional compounds listed in this paragraph. The composition of the present invention as described in this paragraph will be referred to hereinafter as Composition C(1). Again, it is noted that not all of the compounds listed here are shown in FIG. 1. It is believed that these compounds arise as impurities in the starting materials, impurities in the solvent, or either of these types of impurities that have reacted to form other compounds under the reaction conditions used to produce the $CF_3CClFCH_2OC(=O)CH_3$.

In one particular embodiment where the composition of the present invention comprises 2-chloro-2,3,3,3-tetrafluoropropyl acetate ($CF_3CClFCH_2OC(=O)CH_3$), at least one solvent comprising diethyl ether and additional compounds, the additional compounds comprise 2-chloro-2,3,3,3-tetrafluoropropanol ($CF_3CClFCH_2OH$), ethyl acetate, and acetic acid. A representative amount of the additional compounds for this embodiment is about 17 weight % acetic acid, about 3 weight % ethyl acetate, and less than about 1 weight % 2-chloro-2,3,3,3-tetrafluoropropanol, all of which are relative to the amount of the 2-chloro-2,3,3,3-tetrafluoropropyl acetate ($CF_3CClFCH_2OC(=O)CH_3$) in the composition.

In one other particular embodiment where the composition of the present invention comprises 2-chloro-2,3,3,3-tetrafluoropropyl acetate ($CF_3CClFCH_2OC(=O)CH_3$), at least one solvent which is DMF and pyridine and additional compounds, the additional compounds comprise 2-chloro-2,3,3,3-tetrafluoropropyl formate ($CF_3CClFCH_2OCH(=O)$), 2-chloro-2,3,3,3-tetrafluoropropanol ($CF_3CClFCH_2OH$) acetic anhydride and acetic acid. In this embodiment, the solvent is a mixture of and DMF and pyridine. A representative amount of the additional compounds for this embodiment is about 3 weight % or less for all the additional compounds.

In one particular embodiment where the composition of the present invention comprises 2-chloro-2,3,3,3-tetrafluoropropyl acetate ($CF_3CClFCH_2OC(=O)CH_3$), at least one solvent, which is DMF and pyridine, and additional compounds, the additional compounds comprise TFE, HCFC-124, 3-chloro-3,4,4,4-trifluoro-2-butanone ($CF_3CClFCH_2OC(=O)CH_3$), ethyl methyl ether, and methyl acetate, all in the liquid phase. In this embodiment, the solvent is a mixture of DMF and pyridine. A representative amount of the additional compounds for this embodiment is about 85 weight % 2-chloro-2,3,3,3-tetrafluoropropyl acetate ($CF_3CClFCH_2OC(=O)CH_3$), about 6 weight % of 2-chloro-1,1,1,2-tetrafluoro ethane (HCFC-124), about 2.5 weight % 3-chloro-3,4,4,4-trifluoro-2-butanone ($CF_3CClFCH_2OC(=O)CH_3$), about 2.5 weight unknowns, and less than 1 weight % each of TFE, ethyl methyl ether and methyl acetate.

In another particular embodiment, where the composition of the present invention comprises 2-chloro-2,3,3,3-tetrafluoropropyl acetate ($CF_3CClFCH_2OC(=O)CH_3$), at least one solvent, which in this case is a mixture of DMF and pyridine, and additional compounds, the additional compounds comprise HFO-1123, HFO-1234yf, water, formaldehyde, HCFC-124, CFC-114a, methyl acetate, methyl formate, 3-chloro-3,4,4,4-trifluoro-2-butanone, 2,3,3,3-tetrafluoropropyl acetate, 2-chloro-2,3,3,3-tetrafluoropropanol, acetic anhydride, and 2-chloro-2,3,3,3-tetrafluoropropoxy methyl acetate. A representative amount of the additional compounds for this embodiment is about 6-8 weight % each of HCFC-124, and 2-chloro-2,3,3,3-tetrafluoropropoxy methyl acetate: about 1-4 weight % each of water, CFC-114a, 3-chloro-3,4,4,4-tetrafluoro-2-butanone, 2-chloro-2,3,3,3-tetrafluoropropanol, and acetic anyhydride; and less than about 1 weight % of the remainder.

In another particular embodiment, where the composition of the present invention comprises 2-chloro-2,3,3,3-tetrafluoropropyl acetate ($CF_3CClFCH_2OC(=O)CH_3$), at least one solvent, which is DMF and pyridine, and additional compounds, the additional compounds comprise HCFC-124, CFC-114a, methyl acetate, ethyl formate, methyl formate, acetic acid, 3-chloro-3,4,4,4-tetrafluoro-2-butanone, 2-chloro-2,3,3,3-tetrafluoropropanol, acetic anyhydride, and 2-chloro-2,3,3,3-tetrafluoropropoxy methyl acetate. A representative amount of the additional compounds for this embodiment is about 7-8 weight % of 2-chloro-2,3,3,3-tetrafluoropropoxy methyl acetate; about 3 weight % of HCFC-124; and less than about 2 weight % of the remainder.

In another embodiment, the composition comprising $CF_3CClFCH_2OZnCl$ and at least one solvent may further comprise at least one additional compound selected from the group consisting of HFO-1234yf, CFC-114a, HCFC-124, CFO-1113, HFO-1123, HFO-1132a, TFE, HCFO-1122, methanol, methyl acetate, methyl formate, dimethylacetamide, dimethylformamide, pyridine, ethyl acetate, acetic acid, diethyl ether, formaldehyde, trifluoroacetaldehyde, $CF_3CClFCH_2OH$, $CF_3CClFCH_2OC(=O)CH_3$, 2-chloro-2,3,3,3-tetrafluoropropoxy methyl acetate ($CF_3CFClCH_2OCH_2C(=O)CH_3$), and mixtures thereof, meaning mixtures of any of the foregoing additional compounds listed in this paragraph. The composition of the present invention as described in this paragraph will be referred to hereinafter as Composition D(1). Again, it is noted that not all of the compounds listed here are shown in FIG. 1. It is believed that these compounds arise as impurities in the starting materials, impurities in the solvent, or either of these types of impurities that have reacted to form other compounds under the reaction conditions used to produce the $CF_3CClFCH_2OZnCl$.

In one particular embodiment, the composition comprising zinc (2-chloro-2,3,3,3-tetrafluoropropoxy) chloride ($CF_3CClFCH_2OZnCl$) and at least one solvent comprising pyridine further comprises 2-chloro-1,1,1,2-tetrafluoroethane (HCFC-124), methyl formate, methanol and trifluoroethene (HFO-1123) as the additional compounds. In this embodiment, the solvent is pyridine. In this particular embodiment, the composition comprises about 80 weight % or more of solvent, that being pyridine, about 12 weight % or more zinc (2-chloro-2,3,3,3-tetrafluoropropoxide) chloride ($CF_3CClFCH_2OZnCl$ about 3 weight % HCFC-124, and 1 weight % or less of the remaining components, those being methyl formate, methanol, and HFO-1123.

In another particular embodiment, the composition comprising zinc (2-chloro-2,3,3,3-tetrafluoropropoxy) chloride ($CF_3CClFCH_2OZnCl$) and at least one solvent comprising a mixture of DMF and pyridine further comprises tetrafluoroethene, acetic acid, methyl formate, methyl acetate, HCFC-124, HFO-1234yf, and 2-chloro-2,3,3,3-tetrafluoropropyl acetate ($CF_3CClFCH_2OC(=O)CH_3$) as additional compounds. In this particular embodiment, the HCFC-124, $CF_3CClFCH_2OC(=O)CH_3$, and the HFO-1234yf are each present at about 3-5 weight % relative to the $CF_3CClFCH_2OZnCl$.

In another particular embodiment, the composition comprising zinc (2-chloro-2,3,3,3-tetrafluoropropoxy) chloride ($CF_3CClFCH_2OZnCl$) and at least one solvent comprising a mixture of DMF and pyridine further comprises HFO-1123, trifluoroacetaldehyde, formaldehyde, HCFC-124, CFC-114a, methanol, methyl formate, and 2-chloro-2,3,3,3-tetrafluoropropyl acetate as additional compounds. In this embodiment, the HCFC-124 is present at about 13 weight % or less relative to the amount of zinc (2-chloro-2,3,3,3-tetrafluoropropoxy) chloride ($CF_3CClFCH_2OZnCl$), and the remaining additional compounds are present at 1 weight % or less.

In another particular embodiment, the composition comprising zinc(2-chloro-2,3,3,3-tetrafluoropropoxy) chloride ($CF_3CClFCH_2OZnCl$) and at least one solvent comprising a mixture of DMF and pyridine further comprises HFO-1123, trifluoroacetaldehyde, HFO-1234yf, formaldehyde, HCFC-124, CFC-114a, methanol, dimethyl ether, methyl formate, ethyl formate, 2-chloro-2,3,3,3-tetrafluoropropyl acetate, and acetic anhydride as additional compounds. In this embodiment, the HCFC-124 was present at about 8 weight %, and the other additional compounds were each present at about 2 weight % or less.

Certain components of the disclosed compositions are commercially available, such as for instance the solvents. Other components may be prepared by methods known in the art. HFO-1234yf, $CF_3CClFCH_2OH$, $CF_3CClFCH_2OZnCl$ and $CF_3CClFCH_2OC(=O)CH_3$ may be prepared as described herein below.

The compositions as disclosed herein may be prepared by the reaction chemistry described below.

Reaction Chemistry

Before addressing details of embodiments described below, some terms are defined or clarified.

As used herein, formaldehyde refers to the compound having the structure $H_2C=O$, which is also known to occur in the form of a cyclic trimer 1,3,5-trioxane, and also as paraformaldehyde or polyoxymethylene (sometimes shown as $(H2C=O)_n$).

As used herein, reactive metal refers to reactive metals such as magnesium turnings, activated zinc powder, aluminum, and a powder of any of the following metals: magnesium, calcium, titanium, iron, cobalt, nickel, copper, zinc and indium, and also zinc(II) salts. Magnesium turnings are pieces of magnesium which are cut to produce small pieces with higher surface areas and generally low amounts of surface oxides (which reduce reactivity). The reactive metal powders of magnesium, calcium, titanium, iron, cobalt, nickel, copper, zinc and indium are Rieke metals, which are prepared by a specific procedure which produces high surface area metal powders which are very reactive in reactions such as those of the present invention. Without wishing to be bound by any particular theory, Rieke metals are thought to be highly reactive because they have high surface areas and lack passivating surface oxides.

As used herein, a dehydrating agent is a gas or gaseous mixture containing at least one gas selected from the group consisting of: methane, ethane, propane, butane, natural gas, alcohols, aldehydes, and carbon monoxide. As used herein, natural gas refers to a gaseous mixture having methane as the major component, but also comprising quantities of ethane, butane, propane, carbon dioxide, nitrogen.

As used herein dehydroxychlorinating refers to removing a hydroxyl group and a chlorine atom from adjacent carbon atoms of a hydrofluoroalkanol to form a hydrofluoroalkene.

In one embodiment, 2-chloro-1,1,1,2-tetrafluoropropanol ($CF_3CClFCH_2OH$) may be prepared by reaction of a CFC-114a with an aldehyde, and a reactive metal in a reaction solvent, thus producing 2-chloro-1,1,1,2-tetrafluoro-propanol ($CF_3CClFCH_2OH$) and a solvent. The method as described in this paragraph produces Composition B as described above.

Alternatively, CFC-114a is reacted with an aldehyde, and a reactive metal in a reaction solvent to generate a composition a metal hydrofluoroalkoxide, $CF_3CFClCH_2OZnCl$ and a solvent. The method as described in this paragraph produces Composition D as described above.

The metal hydrofluoroalkoxide may be neutralized to provide a hydrofluoroalkanol, $CF_3CClFCH_2OH$, which can be isolated. The neutralization may comprise dilution with an organic solvent, and reaction with a dilute aqueous solution of an acid, including without limitation dilute aqueous hydrochloric acid or dilute aqueous sulfuric acid. Upon separation of the organic solvent phase from the aqueous phase, the organic solvent phase is washed further with an aqueous salt solution. The organic solvent phase is then dried and the solvent removed by evaporation or distillation to provide the hydrofluoroalkanol product.

Additionally, the metal hydrofluoroalkoxide, $CF_3CClFCH_2OZnCl$, may be used in further reactions as described later to produce a hydrofluoroalkene, HFO-1234yf, without neutralization. The method as described in this paragraph produces Composition A as described above.

In addition to the reactive metal, (i.e., just the zinc), a metal salt may be added to the mixture comprising the reaction of the CFC-114a. Suitable zinc salts include zinc acetate, zinc bromide, zinc chloride, zinc citrate, zinc sulfate and mixtures thereof. In one embodiment, the zinc salt is zinc acetate. The amount of zinc salt added may be from 0.1 to 1.0 mole per mole of CFC-114a. The aldehyde for reaction with CFC-114a may be selected from the group consisting of formaldehyde, acetaldehyde, propionaldehyde, butyraldehyde and isobutyraldehyde. The mole ratio of reactive metal to CFC-114a is from about 1:1 to about 2.5:1. The mole ratio of aldehyde to CFC-114a is from about 1:1 to about 3:1.

In some embodiments, wherein paraformaldehyde is used as the aldehyde, a quaternary ammonium salt is added to the reaction. In one embodiment, the quaternary ammonium salt is a bis-alkyldimethyl ammonium acetate. Without wishing to be bound by any particular theory, such quaternary ammonium salts are believed to promote the decomposition of paraformaldehyde to formaldehyde. In some embodiments the amount of quaternary ammonium salt added is from about 1 weight % to about 20 weight % by weight of the amount of paraformaldehyde. In other embodiments, the amount of quaternary ammonium salt added is from about 5 weight % to about 10 weight % by weight of the amount of paraformaldehyde.

The reaction of CFC-114a with an aldehyde and reactive metal is conducted in a reaction solvent. The reaction solvent may be selected from the group consisting of alkyl, dialkyl, and trialkyl linear or cylic amines, N-methylpyrrolidine, N-methylpiperidine, sulfoxides, ethers, pyridine or alkyl-substituted pyridines, pyrazine or pyrimidine, alkyl and aromatic nitriles, hexamethylphosphoramide, and mixtures thereof. In another embodiment, the solvent is selected from the group consisting of trialkylamines, N-methylpyrrolidine, N-methylpiperidine, pyridine, alkyl-substituted pyridines, dimethylformamide, pyrazine or pyrimidine, and mixtures thereof. In another embodiment, the reaction solvent is selected from the group consisting of dimethylformamide, tetrahydrofuran, pyridine, dimethylacetamide, 1,4-dioxane, N-methylpyrrolidone, diethyl ether and mixtures thereof. In another embodiment, the solvent is pyridine or alkyl-substituted pyridines or mixtures thereof. In another embodiment, the solvent is selected from the group consisting of alcohols, esters, and mixtures thereof. In another embodiment, the solvent is selected from the group consisting of methanol, ethanol, methyl formate, dimethyl sulfoxide, acetonitrile, benzonitrile and mixtures thereof, or mixtures of these with any of the aforementioned other solvents.

The amount of water present in the reaction of CFC-114a with an aldehyde and reactive metal may be less than 1000 ppm. The reaction of CFC-114a with an aldehyde and reactive metal is performed at a temperature of from about 30° C. to about 100° C., and the reaction is conducted for from about 3 to about 10 hours. The aldehyde may be pre-treated with the reaction solvent for a period of time before the reaction. For instance, paraformaldehyde is pre-treated in pyridine for four hours at 60° C. prior to reaction with CFC-114a and reactive metal. The pre-treatment may occur for two to six hours or there may be no pre-treatment, and the reaction may be commenced upon charging all of the reactants and reaction solvent to the reaction vessel sequentially.

The reaction of CFC-114a with an aldehyde and reactive metal may be performed in a closed vessel or other reactor. The reaction may be performed under autogenous pressure. Alternatively, the reaction of CFC-114a with an aldehyde and reactive metal may be performed in an open vessel or reactor, equipped with a suitable condenser to prevent escape of unreacted CFC-114a.

Another process for the manufacture of HFO-1234yf comprises reacting CFC-114a with an aldehyde and zinc metal to generate $CF_3CClFCH_2OZnCl$ and then reductively dehydroxychlorinating $CF_3CClFCH_2OZnCl$ in a second step to produce HFO-1234yf. The process for producing HFO-1234yf may comprise neutralizing $CF_3CClFCH_2OZnCl$ to produce $CF_3CClFCH_2OH$; mixing a dehydrating agent with $CF_3CClFCH_2OH$, thereby forming a gaseous mixture; and contacting a catalyst with the gaseous mixture, thereby forming HFO-1234yf. The gaseous mixture is a mixture of the dehydrating agent and hydrofluoroalkanol, mixed in the gas phase.

The reaction product of CFC-114a, an aldehyde and a reactive metal may be neutralized by diluting the reaction product mixture with a mixture of a solvent, ice, and an aqueous solution of an acid. The solvent can be any commonly used organic solvent, such as diethyl ether. The aqueous solution of an acid may be an aqueous solution of a common mineral acid, such as hydrochloric acid. After stirring the resulting mixture for a period of time, the layer comprising the organic solvent is separated. The organic solvent layer can be subsequently washed with a dilute aqueous solution of an acid, followed by a brine solution. The organic layer is then dried. The drying is accomplished by stirring the organic layer over an anhydrous salt, such as anhydrous magnesium sulfate or anhydrous sodium sulfate. The organic solvent may then be evaporated to afford $CF_3CClFCH_2OH$.

The catalyst is at least one transition metal. The metal is selected from the group consisting of: Ni, Pd, and Pt. In one embodiment, the catalyst is a supported catalyst which comprises a transition metal and a support material. The support material is at least one selected from the group consisting of activated carbon and γ-alumina.

The dehydrating agent is at least one gas selected from the group consisting of: methane, ethane, propane, butane, natural gas, alcohols, aldehydes, and carbon monoxide.

The mixing step takes place at a temperature in the range between about 65-80° C.

The gaseous mixture may be preheated prior to the contacting step. The preheating takes place at a temperature in the range between about 250 to about 450° C.

The contacting step preferably takes place at a temperature in the range between about 400 to about 700° C. The contacting step also preferably takes place for between about 20 to about 25 seconds.

Residual HF contained in the HFO-1234yf product may then be neutralized, wherein the HF is neutralized by passing the HFO-1234yf product through a KOH solution. Alternatively, HF may be removed from the HFO-1234yf product by some other method known in the art, including for instance azeotropic distillation.

The gaseous mixture may further comprise at least one diluent inert gas selected from the group consisting of: nitrogen, helium, and argon.

The conversion of the $CF_3CClFCH_2OH$ to HFO-1234yf is in the range between about 50 to about 100%. The selectivity of $CF_3CClFCH_2OH$ to HFO-1234yf is in the range between about 29 to about 100%.

The pressure during the contacting step is in the range between about 1 to about 100 psig.

The reductive dehydroxychlorination may be carried out by reacting the $CF_3CClFCH_2OZnCl$, described earlier as Composition D, or $CF_3CClFCH_2OH$, described earlier as Composition B, with a carboxylic acid anhydride and a reactive metal in a reaction solvent to form a hydrofluoroalkene. Either of $CF_3CClFCH_2OZnCl$ or $CF_3CClFCH_2OH$ will react with the acid anhydride to produce an ester, $CF_3CClFCH_2OC(=O)CH_3$, which is then reduced by the reactive metal to produce HFO-1234yf. This 1234yf composition contains additional compounds as described earlier as Composition A.

This reaction may be run as described with addition of both reagents in the same reaction vessel or the acid anyhydride may be added alone to produce $CF_3CClFCH_2OC(=O)CH_3$, which may be isolated. And then the reactive metal may be added to the $CF_3CClFCH_2OC(=O)CH_3$ to produce the HFO-1234yf. In this process the carboxylic acid anhydride is selected from the group consisting of acetic anhydride, propionic anhydride, butyric anhydride, succinic anhydride, glutaric anhydride, and adipic anhydride. The reactive metal powder is as described previously herein. The reductive dehydroxychlorination can be done without neutralizing the product mixture from the reaction of CFC-114a with zinc and an aldehyde. Or the reductive dehydroxychlorination may be done after first isolating the $CF_3CClFCH_2OH$, and then esterification by reaction with a carboxylic acid anhydride and a reactive metal to form $CF_3CClFCH_2OC(=O)CH_3$. Any of these dehydroxychlorinations produce Composition C as described above.

In some embodiments, the product of the reductive dehydroxychlorination is HFO-1234yf as described above, which further comprises 1,3-bistrifluoromethyl-1,3-difluorocyclobutane, a substituted cyclobutane of the formula:

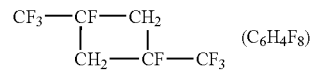

This compounds may also be represented by the formula:

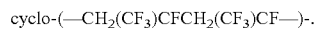

The carboxylic acid anhydride may be acetic anhydride. The mole ratio of acetic anhydride to $CF_3CClFCH_2OH$ is from about 1:1 to about 2:1. The mole ratio of reactive metal to $CF_3CClFCH_2OH$ is from about 1:1 to about 2.5:1. The reductive dehydroxychlorination may be conducted in a reaction solvent which is the same solvent that the reaction of CFC-114a with reactive metal and an aldehyde is conducted in or a different solvent.

The reaction chemistry disclosed herein that produces the compositions disclosed herein is particularly useful in producing HFO-1234yf without producing HFO-1234ze (1,3,3, 3-tetrafluoropropene, E- or Z-isomer). This results in a product, HFO-1234yf, which is essentially free of HFO-1234ze, as described above. Other common processes known for production of HFO-1234yf involve dehydrofluorination of saturated compounds such as 1,1,1,2,2-pentafluoropropane (HFC-245cb) and/or 1,1,1,2,3-pentafluoropropane (HFC-245eb). This dehydrofluorination chemistry regardless of whether accomplished liquid phase by reaction with caustic or vapor phase by a thermal and/or catalytic process produces percent quantities of HFO-1234ze. The presence of this compound has not been acceptable to the refrigerants industry as it causes decreasing performance in refrigeration and air conditioning systems of all types. Therefore, extensive distillation processes must be added to the back end of any commercial manufacturing facility utilizing this chemistry to allow the removal of HFO-1234ze from the product HFO-1234yf. Therefore any chemistry that can produce HFO-1234yf essentially free of HFO-1234ze has a great advantage in the industry.

Utility

The compositions disclosed herein comprising HFO-1234yf are useful as low global warming potential (GWP) heat transfer compositions, aerosol propellant, foam expansion agents (also known as foaming agents or blowing agents), solvents, cleaning agents, carrier fluids, displacement drying agents, buffing abrasion agents, polymerization media, expansion agents for polyolefins and polyurethane, gaseous dielectrics, extinguishing agents, and fire suppression agents in liquid or gaseous form. The disclosed compositions can act as a working fluid used to carry heat from a heat source to a heat sink. Such heat transfer compositions may also be useful as a refrigerant in a cycle wherein the fluid undergoes a phase change; that is, from a liquid to a gas and back or vice versa.

Examples of heat transfer systems include but are not limited to air conditioners, freezers, refrigerators, heat pumps, water chillers, flooded evaporator chillers, direct expansion chillers, walk-in coolers, heat pumps, mobile refrigerators, mobile air conditioning units and combinations thereof.

In one embodiment, the compositions comprising HFO-1234yf are useful in mobile heat transfer systems, including refrigeration, air conditioning, or heat pump systems or apparatus. In another embodiment, the compositions are useful in stationary heat transfer systems, including refrigeration, air conditioning, or heat pump systems or apparatus.

As used herein, mobile heat transfer systems refers to any refrigeration, air conditioner, or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "containers" (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand alone devices located out of doors, such as a soft drink vending machine. These stationary applications may be stationary air conditioning and heat pumps (including but not limited to chillers, high temperature heat pumps, residential, commercial or industrial air conditioning systems, and including window, ductless, ducted, packaged terminal, chillers, and those exterior but connected to the building such as rooftop systems). In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigerator systems.

The compositions disclosed herein comprising $CF_3CClFCH_2OH$; and at least one solvent are useful in methods to prepare HFO-1234yf as described previously herein.

The compositions disclosed herein comprising $CF_3CClFCH_2OC(=O)CH_3$; and at least one solvent are useful in methods to prepare HFO-1234yf as described previously herein.

The compositions disclosed herein comprising $CF_3CClFCH_2OZnCl$; and at least one solvent are useful in methods to prepare HFO-1234yf as described previously herein.

Without further elaboration, it is believed that one skilled in the art can, using the description herein, utilize the present invention to its fullest extent. The following specific embodiments are, therefore, to be construed as merely illustrative, and do not constrain the remainder of the disclosure in any way whatsoever.

EXAMPLES

The concepts described herein will be further described in the following examples, which do not limit the scope of the invention described in the claims. The results as given in GC or GC-MS area percent are thought to approximate weight percent.

Example 1

Example 1 demonstrates the preparation of 2-chloro-2,3,3,3-tetrafluoropropanol ($CF_3CClFCH_2OH$) from 1,1,1,2-tetrafluoro-2,2-dichloroethane (CFC-114a), and the particular reaction products obtained from this preparation.

A 400 ml Hastelloy™ C shaker tube was charged with 32.8 grams (0.5 mole) of activated Zinc powder, 12 grams (0.5 mole) of paraformaldehyde and 180 ml anhydrous dimethylformamide (DMF) under $N_2$. The tube was cooled down to −15° C. and 64.4 grams (0.2 mole) of 1,1-dichloro-1,2,2,2-tetrafluoroethane (CFC-114a) was added. Then the reaction mixture was stirred at 50° C. for 6 hours. The results of gas chromatographic analysis of the reaction products are summarized in Table 1. The reaction mixture was cooled to room temperature and then poured into a 200 mL mixture of ice, 10% aqueous HCl and 200 mL diethyl ether. The solution was stirred for 30 min and the organic layer was separated and washed with 100 mL of 2% aqueous HCl and then 100 mL brine. The organic layer was dried with $MgSO_4$, and diethyl ether was removed by vacuum to afford 13.36 grams of product 2-chloro-2,3,3,3-tetrafluoropropanol ($CF_3CClFCH_2OH$), thus obtaining an 8% yield.

TABLE 1

| Component | GC area percent (%) |
|---|---|
| 2-chloro-2,3,3,3-tetrafluoropropanol ($CF_3CClFCH_2OH$) | 7.076 |
| 2-chloro-1,1,1,2-tetrafluoroethane (HCFC-124) | 8.18 |
| Methanol | 0.335 |
| DMF | 83.9 |

Example 2

Example 2 demonstrates the synthesis of 2,3,3,3-tetrafluoropropene from 1,1-dichloro-1,2,2,2-tetrafluoroethane (CFC-114a), and the particular reaction products obtained from this synthesis.

A 400 ml Hastelloy™ C shaker tube was charged with 20 grams (0.315 mole) of activated zinc powder, 7.5 grams (0.25 mole) of paraformaldehyde and 130 mL anhydrous DMF under $N_2$. The tube was cooled to −15° C., and 43 grams (0.25 mole) of 1,1-dichloro-1,2,2,2-tetrafluoroethane (CFC-114a) were added. The reaction mixture was stirred at 60° C. for 6 hours and then cooled to room temperature. 30 grams (0.46 mole) of activated zinc powder, and 50 grams (0.5 mole) of acetic anhydride were added to the reactor. The reaction mixture was stirred at 50° C. for 6 hr and then cooled to room temperature. The gas phase and the liquid phase were analyzed by gas chromatography-mass spectrometry (GC-MS) Results are summarized in Table 2. The 1234yf composition is demonstrated in the gas phase portion of Table 2 below, and the liquid phase portion of Table 2 is what is left in the reactor when the gas sample comes off. Note that the gas phase sample corresponds to the compositions comprising HFO-1234yf and additional compounds.

TABLE 2

| Component (liquid phase remaining in the reactor after reaction) | GC area percent (%) |
|---|---|
| 2,3,3,3-tetrafluoropropene (HFO-1234yf) | 5.50 |
| 2-chloro-1,1,1,2-tetrafluoroethane (HCFC-124) | 16.93 |
| 3,4,4,4-tetrafluoro-2-butanone | 3.7 |
| Acetyl fluoride | 4.57 |
| Methyl acetate | 4.72 |
| Acetic acid | 52.7 |
| Acetic anhydride | 4.88 |
| Component (gas phase HFO-1234yf product) | |
| 2,3,3,3-tetrafluoropropene (HFO-1234yf) | 83.42 |
| Tetrafluoroethene | 0.75 |
| 1,1-difluoroethene | 0.28 |
| Trifluoroethene | 1.69 |
| 2-chloro-1,1,1,2-tetrafluoroethane (HCFC-124) | 11.62 |

Example 3

Example 3 demonstrates the synthesis of 2-chloro-2,3,3,3-tetrafluoropropanol ($CF_3CClFCH_2OH$) from CFC-114a in pyridine and the particular reaction products obtained from this synthesis.

An 80 mL Fisher Porter tube was charged with 2.24 grams (0.034 mole) of activated zinc powder, 1.24 grams (0.041 mole) of paraformaldehyde and 30 mL anhydrous pyridine under $N_2$. The tube was cooled to −15° C., and 5 grams (0.029 mole) of 1,1-dichloro-1,2,2,2-tetrafluoroethane (CFC-114a) were added and the reaction mixture was stirred at 50° C. for 8 hours. The reactor pressure dropped from 25 psig to 8 psig at the end of the reaction. The reaction mixture was cooled to room temperature and analyzed by GC-MS. For GC-MS analysis, a portion of the reaction mixture was acidified with a 10% solution of HCl in acetone. The data is reported by area percent of GC-MS in Table 3.

TABLE 3

| (liquid phase) | |
|---|---|
| Component | GC-MS area percent (%) |
| 2-chloro-2,3,3,3-tetrafluoropropanol ($CF_3CClFCH_2OH$) | 8.586 |
| 2-chloro-1,1,1,2-tetrafluoroethane (HCFC-124) | 2.887 |
| Methyl formate | 0.420 |
| Chlorotrifluoroethene (CFO-1113) | 0.637 |
| Trifluoroethene (HFO-1123) | 0.0140 |
| Methanol | 0.135 |
| Pyridine | 87.194 |

Example 4

Example 4 demonstrates the synthesis of 2-chloro-2,3,3,3-tetrafluoropropanol ($CF_3CClFCH_2OH$) in dimethylacetamide, and the particular reaction products obtained from this synthesis.

An 80 mL Fisher Porter tube was charged with 2.23 grams (0.034 mole) of activated zinc powder, 1.21 grams (0.040 mole) of paraformaldehyde and 30 mL anhydrous dimethylacetamide under $N_2$. The tube was cooled to −15° C., and 5.2 grams (0.030 mole) of 1,1-dichloro-1,2,2,2-tetrafluoroethane (CFC-114a) were added. The reaction mixture was stirred at 60° C. for 4.5 hours. The pressure of the reactor dropped from 30 psig to 9 psig at the end of the reaction. The reaction mixture was cooled to room temperature, and it was analyzed by GC-MS. For GC-MS analysis, a portion of the reaction mixture was acidified with a 10% solution of HCl in acetone. The data is reported by area percent of GC-MS in Table 4.

TABLE 4

| (liquid phase) | |
|---|---|
| Component | GC-MS area percent (%) |
| 2-chloro-2,3,3,3-tetrafluoropropanol ($CF_3CClFCH_2OH$) | 5.750 |
| 2-chloro-1,1,1,2-tetrafluoroethane (HCFC-124) | 2.181 |
| Methyl formate | 0.181 |
| Chlorotrifluoroethene (CFO-1113) | 2.634 |
| Trifluoroethene (HFO-1123) | 0.029 |
| Dimethylacetamide | 88.463 |

Example 5

Example 5 demonstrates the synthesis of $CF_3CClFCH_2OZnCl$ in pyridine, with pre-treatment of formaldehyde, and the particular reaction products obtained from this synthesis.

An 80 ml Fisher Porter tube was charged with 1.82 grams (0.06 mole) of paraformaldehyde and 30 ml anhydrous pyridine under $N_2$. The tube was heated to 60° C. and stirred for 4 hours. The tube was cooled to room temperature, and 2.24 grams (0.034 mole) of activated zinc powder were added. After purging with $N_2$ for 15 minutes, the tube was cooled to −15° C. and 5 grams (0.029 mole) of 1,1-dichloro-1,2,2,2-tetrafluoroethane (CFC-114a) were added. Then the reaction mixture was stirred at 50° C. for 8 hours. The pressure of the reactor dropped from 25 psig to 9 psig at the end of the reaction. The reaction mixture was cooled to room temperature and analyzed by GC-MS. For GC-MS analysis, a portion of the reaction mixture was acidified with a 10% solution of HCl in acetone. The data is reported by area percent of GC-MS in Table 5. The selectivity of 114a to $CF_3CClFCH_2OZnCl$ (analyzed as $CF_3CClFCH_2OH$) increased to 78.7%.

TABLE 5

(Liquid phase)

| Component | GC-MS area percent (%) |
|---|---|
| 2-chloro-2,3,3,3-tetrafluoropropanol ($CF_3CClFCH_2OH$), that represents zinc (2-chloro-2,3,3,3-tetrafluoropropoxy) chloride ($CF_3CClFCH_2OZnCl$) | 12.06 |
| 2-chloro-1,1,1,2-tetrafluoroethane (HCFC-124) | 3.07 |
| Methyl formate | 1.02 |
| Methanol | 0.102 |
| Trifluoroethene (HFO-1123) | 0.18 |
| Pyridine | 83.55 |

Example 6

Example 6 illustrates the esterification of 2-chloro-2,3,3,3-tetrafluoropropanol ($CF_3CClFCH_2OH$) with acetic anhydride to produce $CF_3CClFCH_2OC(=O)CH_3$ and the reaction products obtained from this esterification.

An 80 ml Fisher Porter tube was charged with 2 grams (0.012 mole) of $CF_3CClFCH_2OH$ (which contains ~15% diethyl ether), 1.35 grams (0.0132 mole) of acetic anhydride and 0.25 grams of concentrated sulfuric acid. The mixture was stirred at 60° C. for 6 hours. The reaction mixture was cooled to room temperature and analyzed by GC-MS. The data is reported by area percent of GC-MS in Table 6. These results show that more than 99% of $CF_3CClFCH_2OH$ has been converted to $CF_3CClFCH_2OC(=O)CH_3$.

TABLE 6

| Component | GC-MS area percent (%) |
|---|---|
| 2-chloro-2,3,3,3-tetrafluoropropyl acetate ($CF_3CClFCH_2OC(=O)CH_3$) | 72.55 |
| 2-chloro-2,3,3,3-tetrafluoropropanol ($CF_3CClFCH_2OH$) | 0.198 |
| Ethyl acetate | 3.12 |
| Acetic acid | 17.24 |
| Diethyl ether | 6.19 |

Example 7

Example 7 illustrates the direct esterification of $CF_3CClFCH_2OZnCl$ to $CF_3CClFCH_2OC(=O)CH_3$, and the reaction products obtained from this direct esterification.

10 ml of a pyridine solution containing about 14% $CF_3CClFCH_2OZnCl$ was vacuum evaporated at room temperature to remove the majority of the pyridine. Then 2.0 grams acetic anhydride and 1 mL DMF were added to the resultant solid. The mixture was stirred at 60° C. for 7 hours. The reaction mixture was cooled to room temperature and analyzed by GC-MS. The data is reported by area percent of GC-MS in Table 7.

TABLE 7

| Component | GC-MS area percent (%) |
|---|---|
| 2-chloro-2,3,3,3-tetrafluoropropyl acetate ($CF_3CClFCH_2OC(=O)CH_3$) | 71.8 |
| 2-chloro-2,3,3,3-tetrafluoropropyl formate ($CF_3CClFCH_2OCH(=O)$) | 2.01 |
| 2-chloro-2,3,3,3-tetrafluoropropanol ($CF_3CClFCH_2OH$) | 0.115 |
| Acetic anhydride | 2.61 |
| Acetic acid | 2.58 |
| DMF/pyridine (solvent) | 13.22 |

Example 8

Example 8 illustrates the conversion of 2-chloro-2,3,3,3-tetrafluoropropyl acetate ($CF_3CClFCH_2OC(=O)CH_3$) to 2,3,3,3-tetrafluoropropene (HFO-1234yf).

The reaction mixture from Example 7, above, was stirred with 1 gram of $Na_2CO_3$ to remove the acid generated in the esterification step. Then 3 moles of DMF and 1.3 grams of Zn were added. The reaction was run in an 80 mL Fisher Porter tube at 50° C. for 2 hours and 60° C. for another 2 hours with stirring. The pressure of the reactor increased from 0 psig to 13 psig. The reaction mixture was cooled to room temperature and analyzed by GC-MS. The data is reported by area percent of GC-MS in Table 8. $CF_3CClFCH_2OC(=O)CH_3$ became non-detectable in the liquid phase of the reactor. This result shows that $CF_3CClFCH_2OC(=O)CH_3$ has been quantitatively converted to 2,3,3,3-tetrafluoropropene (HFO-1234yf) under the conditions above. Note that the vapor phase sample corresponds to the compositions comprising HFO-1234yf and additional compounds.

TABLE 8

| Component (vapor phase) | GC-MS area percent (%) |
|---|---|
| 2,3,3,3-tetrafluoropropene (HFO-1234yf) | 94.48 |
| 2-chloro-2,3,3,3-tetrafluoropropanol ($CF_3CClFCH_2OH$) | 0.115 |
| Acetic anhydride | 1.62 |
| Methyl acetate | 0.815 |
| DMF | 1.05 |
| Pyridine | 2.05 |
| (Liquid phase) | |
| 2,3,3,3-tetrafluoropropene (HFO-1234yf) | 1.61 |
| Acetic anhydride | 1.45 |
| Methyl acetate | 0.61 |
| DMF | 86.24 |
| Pyridine | 9.98 |

Example 9

Example 9 demonstrates the reaction of 1,1-dichloro-1,2,2,2-tetrafluoroethane (CFC-114a) with paraformaldehyde to form zinc (2-chloro-2,3,3,3-tetrafluoropropoxy) chloride ($CF_3CClFCH_2OZnCl$) in a mixed solvent of dimethylformamide and pyridine.

An 80 mL Fisher Porter tube was charged with 2.2 grams Zn (0.037 mole), 0.3 grams zinc acetate (0.0016 mole), 2 grams (0.067 mole) of paraformaldehyde, 15 grams of anhydrous pyridine and 15 grams of dimethylformamide under $N_2$. After $N_2$ purge for 15 min, the tube was cooled to −15° C. and 5 grams (0.029 mole) of 1,1-dichloro-1,2,2,2-tetrafluoroethane (CFC-114a) was added and the reaction mixture was stirred at 50° C. for 2 hours. The pressure of the reactor dropped from 25 psig to 5 psig at the end of the reaction. The reaction mixture cooled to room temperature and analyzed by GC-MS. For GC-MS analysis, a portion of the reaction mixture was acidified with a 10% solution of HCl in acetone. The data is reported by area percent from GC-MS in Table 9 (DMF and pyridine peaks are excluded from the integration, i.e., are present in the sample). The selectivity of CFC-114a to $CF_3CCIFCH_2OZnCl$ (analyzed as 2,3,3,3-tetrafluoropropanol ($CF_3CCIFCH_2OH$)) was 83% based on GC-MS analysis.

TABLE 9

(Liquid phase)

| Component | GC-MS area percent |
|---|---|
| Tetrafluoroethene (TFE) | 0.18 |
| Acetic Acid | 3.1 |
| Methyl formate | 0.24 |
| Methyl acetate | 0.68 |
| 2-chloro-1,1,1,2-tetrafluoro ethane (HCFC-124) | 5.18 |
| 2,3,3,3-tetrafluoropropene (HFO-1234yf) | 4.61 |
| 2,3,3,3-tetrafluoropropanol ($CF_3CCIFCH_2OH$), that represents zinc (2-chloro-2,3,3,3-tetrafluoropropoxy) chloride ($CF_3CCIFCH_2OZnCl$) | 80.1 |
| 2-chloro-2,3,3,3-tetrafluoropropyl acetate ($CF_3CCIFCH_2OC(\!\!=\!\!O)CH_3$) | 3.744 |

Example 10

Example 10 illustrates esterification of $CF_3CCIFCH_2OZnCl$ directly to $CF_3CCIFCH_2OC(\!\!=\!\!O)CH_3$ with acetic anhydride in a solvent mixture, and the reaction products obtained from this esterification.°

Excess Zn was filtered from the reaction mixture obtained in Example 9, then the filtrate was charged to an 80 mL Fisher Porter tube, and 4.4 grams of acetic anhydride (0.043 mole) were added. The mixture was stirred at 60° C. for 6 hours. The reaction mixture cooled to room temperature and was analyzed by GC-MS. The data is reported by area percent of GC-MS in Table 10 (DMF, pyridine and acetic anhydride were excluded from integration), i.e., they were present in the final composition. This result shows that more than 94% of $CF_3CCIFCH_2OZnCl$ has been converted to $CF_3CCIFCH_2OC(\!\!=\!\!O)CH_3$ at these reaction conditions.

TABLE 10

(Liquid phase)

| Component | GC-MS area percent |
|---|---|
| TFE | 0.477 |
| 2-chloro-1,1,1,2-tetrafluoro ethane (HCFC-124) | 5.97 |
| 3-chloro-3,4,4,4-trifluoro-2-butanone ($CF_3CCIFCH_2C(\!\!=\!\!O)CH_3$) | 2.57 |
| Ethyl methyl ether | 0.83 |
| Methyl acetate | 0.92 |
| 2-chloro-2,3,3,3-tetrafluoropropyl acetate ($CF_3CCIFCH_2OC(\!\!=\!\!O)CH_3$) | 85.3 |
| Unknowns | 2.46 |

Example 11

Example 11 illustrates the synthesis of 2,3,3,3-tetrafluoropropene (HFO-1234yf) from 1,1,1,2-tetrafluoro-2,2-dichloroethane (CFC-114a) in 3:1 pyridine:DMF solvent.

An 80 mL Fisher Porter tube was charged with 2.1 grams zinc metal (0.032 mole), 0.3 grams zinc acetate (0.0016 mole), 2 grams (0.067 moles) of paraformaldehyde, 30 grams anhydrous pyridine under $N_2$. After $N_2$ purge for 15 minutes, the tube was cooled to −15° C. and 5 grams (0.029 moles) of 1,1-dichlorotetrafluoroethane (CFC-114a) were added. Then the reaction mixture was stirred at 50° C. for 3 hours. The pressure of the reactor dropped from 25 psig to 5.5 psig at the end of the reaction. After the reaction mixture cooled to room temperature, it was analyzed by GC-MS. For GC-MS analysis, a portion of the reaction mixture was acidified with a 10% solution of HCl in acetone. The solvent (pyridine) peak was excluded from the integration. The data is reported in Table 11 by area percent of GC-MS. The selectivity of 1,1-dichlorotetrafluoroethane to $CF_3CCIFCH_2OZnCl$ (analyzed as $CF_3CCIFCH_2OH$) is 81% based on GC-MS analysis.

The excess zinc was filtered off from the reaction mixture and it was charged to an 80 mL Fisher Porter tube. 10 mL of anhydrous DMF and 3.5 grams of acetic anhydride (0.034 moles) were also added to the reactor. The mixture was stirred at 60° C. for 4 hours. The reaction mixture was cooled to room temperature and analyzed by GC-MS. The data is reported in Table 12 by area percent of GC-MS. The solvent (DMF and pyridine) peak were excluded from the integration. This result shows that more than 98% of $CF_3CCIFCH_2OZnCl$ has been converted, and selectivity to $CF_3CCIFCH_2OC(\!\!=\!\!O)CH_3$ and $CF_3CFCICH_2OCH_2C(\!\!=\!\!O)CH_3$ are 89%.

10 mL of the reaction mixture above was left in an 80 mL Fisher Porter tube and activated zinc powder (1 gram, 0.015 moles) was added. The reaction was run at 60° C. for 4 hours with stirring. The pressure of the reactor increased from 6 psig to 15.5 psig. The reaction mixture was cooled to room temperature and the vapor phase and liquid phase were analyzed by GC-MS. The data is reported by area percent of GC-MS. The vapor phase (product 2,3,3,3-tetrafluoropropene) data is listed in Table 13 and the liquid phase (remaining after reaction) data is listed in Table 14 (the solvent peaks for DMF and pyridine were excluded from the integration). $CF_3CCIFCH_2OC(\!\!=\!\!O)CH_3$ became non-detectable in the liquid phase of the reactor. Analysis shows that selectivity to 2,3,3,3-tetrafluoro-1-propene (HFO-1234yf) was about 94%, and selectivity to 1,3-bis-trifluoromethyl-1,3-difluorocyclobutane ($C_6H_4F_8$) was about 5%.

TABLE 11

| Liquid phase $CF_3CCIFCH_2OZnCl$ (analyzed as $CF_3CCIFCH_2OH$) | |
|---|---|
| Compounds | GC-MS area % |
| Trifluoroethylene (HFO-1123) | 1.93 |
| Trifluoroacetaldehyde | 1.05 |
| Formaldehyde | 0.633 |
| 2-Chloro-1,1,1,2-tetrafluoroethane (HCFC-124) | 12.77 |
| 1,1-Dichloro-1,2,2,2-tetrafluoroethane (CFC-114a) | 0.378 |
| Methanol | 0.275 |
| Methyl formate | 0.14 |
| 2-chloro-2,3,3,3-tetrafluoropropanol ($CF_3CCIFCH_2OH$), that represents zinc (2-chloro-2,3,3,3-tetrafluoropropoxy) chloride ($CF_3CCIFCH_2OZnCl$) | 74.68 |

TABLE 11-continued

Liquid phase CF$_3$CClFCH$_2$OZnCl (analyzed as CF$_3$CClFCH$_2$OH)

| Compounds | GC-MS area % |
|---|---|
| 2-chloro-2,3,3,3-tetrafluoropropyl acetate (CF$_3$CClFCH$_2$OC(=O)CH$_3$) | 1.648 |
| Unknowns | 6.39 |

TABLE 12

Liquid phase 2-chloro-2,3,3,3-tetrafluoropropanol

| Compounds | GC-MS area % |
|---|---|
| Trifluoroethylene (HFO-1123) | 0.68 |
| 2,3,3,3-tetrafluoropropene (HFO1234yf) | 0.04 |
| Water | 2.45 |
| Formaldehyde | 0.13 |
| 2-Chloro-1,1,1,2-tetrafluoro ethane (HCFC-124) | 8.74 |
| 1,1-Dichloro-1,2,2,2-tetrafluoroethane (CFC-114a) | 1.03 |
| Methyl acetate | 0.69 |
| Methyl formate | 0.17 |
| 3-chloro-3,4,4,4-tetrafluoro-2-butanone | 1.445 |
| 2,3,3,3-tetrafluoropropyl acetate | 0.31 |
| 2-chloro-2,3,3,3-tetrafluoropropanol (CF$_3$CClFCH$_2$OH) | 1.67 |
| 2-chloro-2,3,3,3-tetrafluoropropyl acetate (CF$_3$CClFCH$_2$OC(=O)CH$_3$) | 65.39 |
| Acetic anhydride | 3.33 |
| 2-chloro-2,3,3,3-tetrafluoropropoxy methyl acetate (CF$_3$CFClCH$_2$OCH$_2$OC(=O)CH$_3$) | 6.47 |
| Unknowns | 7.42 |

TABLE 13

Vapor phase product (2,3,3,3-tetrafluoropropene)

| Compounds | GC-MS area % |
|---|---|
| Tetrafluoroethylene (TFE) | 0.08 |
| Trifluoroethylene (HFO-1123) | 5.84 |
| 1,1,1-trifluoroethane | 0.02 |
| 2,3,3,3-tetrafluoropropene (HFO-1234yf) | 79.93 |
| Chlorotrifluoroethylene (CFO-1113) | 0.06 |
| 2-Chloro-1,1,1,2-tetrafluoroethane (HCFC-124) | 9.10 |
| 1,1-dichloro-1,2,2,2-tetrafluoroethane | 0.05 |
| 1,3-bis-trifluoromethyl-1,3-difluorocyclobutane (C$_6$H$_4$F$_8$) | 4.00 |
| Methyl formate | 0.04 |
| Acetic acid | 0.19 |
| 2,3,3,3-tetrafluoropropyl acetate | 0.1 |
| Unknowns | 0.85 |

TABLE 14

Liquid phase (remaining after reaction)

| Compounds | GC-MS area % |
|---|---|
| Trifluoroethylene (HFO-1123) | 0.98 |
| 1,1,1-Trifluoroethane (HFC-143a) | 0.49 |
| 2,3,3,3-tetrafluoropropene (HFO-1234yf) | 36.85 |
| Water | 8.26 |
| Methanol | 0.25 |
| Acetic acid | 3.47 |
| 2-Chloro-1,1,1,2-tetrafluoro ethane (HCFC-124) | 20.45 |
| Methyl acetate | 2.10 |

TABLE 14-continued

Liquid phase (remaining after reaction)

| Compounds | GC-MS area % |
|---|---|
| Methyl formate | 0.32 |
| 1,3-bis-trifluoromethyl-1,3-difluorocyclobutane (C$_6$H$_4$F$_8$) | 7.91 |
| 2,3,3-trifluoro-2-propen-1-ol acetate | 2.02 |
| 2,3,3,3-tetrafluoropropyl acetate | 2.92 |
| Methyl ethyl ether | 1.462 |
| Acetic anhydride | 7.245 |
| Unknowns | 5.27 |

Example 12

Example 12 illustrates the synthesis of 2,3,3,3-tetrafluoropropene (HFO-1234yf) from 1,1,1,2-tetrafluoro-2,2-dichloroethane (CFC-114a) in 1:1 pyridine:DMF solvent.

A 80 mL Fisher Porter tube was charged with 2.1 grams of zinc metal (0.032 moles), 0.3 grams zinc acetate (0.0016 moles), 2 grams (0.067 moles) of paraformaldehyde, 0.2 grams of bis(hydrogenated alkyl) dimethyl ammonium acetate and 30 grams of anhydrous pyridine under N$_2$. After N$_2$ purge for 15 minutes, the tube was cooled to −15° C. and 5 grams (0.029 moles) of 1,1-dichlorotetrafluoroethane (CFC-114a) were added. Then the reaction mixture was stirred at 50° C. for 3 hours. The pressure of the reactor dropped from 23 psig to 5.5 psig at the end of the reaction. The reaction mixture cooled to room temperature and analyzed by GC-MS. For GC-MS analysis, a portion of the reaction mixture was acidified with a 10% solution of HCl in acetone. The solvent for DMF and pyridine were excluded from the integration. The data is reported in Table 15 as area percent from GC-MS data. The selectivity for CFC-114a to CF$_3$CClFCH$_2$OZnCl (analyzed as CF$_3$CClFCH$_2$OH) was about 85% based on GC-MS analysis.

10 mL of the reaction mixture was filtered and charged into an 80 mL Fisher Porter tube. 10 mL of anhydrous DMF and 3.5 grams of acetic anhydride (0.034 moles) were also added to the reactor. The mixture was stirred at 60° C. for 4 hours. The reaction mixture was cooled to room temperature and analyzed by GC-MS. The data is reported in Table 16 as area percent from GC-MS data. The solvent peaks for DMF and pyridine were excluded from the integration. This result shows that more than 98% of CF$_3$CClFCH$_2$OZnCl was converted, and selectivity for CF$_3$CClFCH$_2$OC(=O)CH$_3$ and CF$_3$CFClCH$_2$OCH$_2$C(=O)CH$_3$ are about 95%.

The reaction mix above was treated with 2 grams of Na$_2$CO$_3$ in an 80 mL Fisher Porter tube. After Na$_2$CO$_3$ was filtered off, activated zinc powder (1 gram, 0.015 moles) was added. The reaction was run in 80 mL Fisher Porter tube at 60° C. for 4 hour with stirring. The pressure of the reactor increased from 5 psig to 18 psig. The reaction mixture was cooled to room temperature and the liquid and vapor phases were analyzed by GC-MS. The data is reported by area percent of GC-MS. The results for the vapor phase (product 2,3,3,3-tetrafluoropropene) are listed in Table 17 and the results for the liquid phase (remaining after reaction) are reported in Table 18 (solvent peaks for DMF and pyridine were excluded from the integration). More than 99% CF$_3$CClFCH$_2$OC(=O)CH$_3$ and more than 95% CF$_3$CFClCH$_2$OCH$_2$C(=O)CH$_3$ were converted. Analysis shows that selectivity for HFO-1234yf was about 98%, and selectivity for 1,3-bis-trifluoromethyl-1,3-difluorocyclobutane (C$_6$H$_4$F$_8$) was about 0.1%.

TABLE 15

Liquid phase CF$_3$CClFCH$_2$OZnCl (analyzed as CF$_3$CClFCH$_2$OH)

| Compounds | GC-MS area % |
|---|---|
| Trifluoroethylene (HFO-1123) | 1.06 |
| Trifluoroacetaldehyde | 0.09 |
| 2,3,3,3-tetrafluoropropene (HFO-1234yf) | 0.03 |
| Formaldehyde | 0.85 |
| 2-Chloro-1,1,1,2-tetrafluoroethane (HCFC-124) | 8.33 |
| 1,1-Dichloro-1,2,2,2-tetrafluoroethane (CFC-114a) | 1.55 |
| Dimethyl ether | 0.14 |
| Methyl formate | 0.55 |
| Ethyl formate | 0.20 |
| 2-chloro-2,3,3,3-tetrafluoropropanol (CF$_3$CClFCH$_2$OH), that represents zinc (2-chloro-2,3,3,3-tetrafluoropropoxy) chloride (CF$_3$CClFCH$_2$OZnCl) | 85.70 |
| 2-chloro-2,3,3,3-tetrafluoropropyl acetate (CF$_3$CClFCH$_2$OC(=O)CH$_3$) | 0.285 |
| Acetic anhydride | 0.10 |
| Unknowns | 0.656 |

TABLE 16

Liquid phase 2-chloro-2,3,3,3-tetrafluoropropyl acetate

| Compounds | GC-MS area % |
|---|---|
| 2-Chloro-1,1,1,2-tetrafluoro ethane (HCFC-124) | 3.17 |
| 1,1-Dichloro-1,2,2,2-tetrafluoroethane (CFC-114a) | 0.62 |
| Methyl acetate | 0.72 |
| Ethyl formate | 0.10 |
| Methyl formate | 0.43 |
| Acetic acid | 15.06 |
| 3-chloro-3,4,4,4-tetrafluoro-2-butanone | 0.32 |
| 2-chloro-2,3,3,3-tetrafluoropropanol (CF$_3$CClFCH$_2$OH) | 1.74 |
| 2-chloro-2,3,3,3-tetrafluoropropyl acetate (CF$_3$CClFCH$_2$OC(=O)CH$_3$) | 68.00 |
| Acetic anhydride | 0.886 |
| 2-chloro-2,3,3,3-tetrafluoropropoxy methyl acetate (CF$_3$CFClCH$_2$OCH$_2$OC(=O)CH$_3$) | 7.63 |
| Unknowns | 1.32 |

TABLE 17

Vapor phase product (2,3,3,3-tetrafluoropropene)

| Compounds | GC-MS area % |
|---|---|
| Trifluoroethylene (HFO-1123) | 0.72 |
| 2,3,3,3-tetrafluoropropene (HFO-1234yf) | 97.46 |
| Water | 0.04 |
| Chlorotrifluoroethylene (CFO-1113) | 0.06 |
| 1,3-bis-trifluoromethyl-1,3-difluorocyclobutane (C$_6$H$_4$F$_8$) | 0.1 |
| Methyl formate | 0.08 |
| Methyl acetate | 0.1 |
| Unknowns | 0.1 |

TABLE 18

Liquid phase remaining after reaction

| Compounds | GC-MS area % |
|---|---|
| Trifluoroethane (HFO-1123) | 0.03 |
| 2,3,3,3-tetrafluoropropene (HFO-1234yf) | 35.26 |
| Water | 0.20 |
| Ethyl formate | 0.26 |
| Ethyl acetate | 0.24 |
| Acetic acid | 11.73 |
| 2-Chloro-1,1,1,2-tetrafluoroethane (HCFC-124) | 5.89 |
| Methyl acetate | 2.10 |
| Methyl formate | 1.0 |
| 1,3-bis-trifluoromethyl-1,3-difluorocyclobutane (C$_6$H$_4$F$_8$) | 0.25 |
| 2-chloro-2,3,3,3-tetrafluoropropanol (CF$_3$CClFCH$_2$OH) | 0.22 |
| 2,3,3-trifluoro-2-propen-1-ol acetate | 1.04 |
| 2-chloro-2,3,3,3-tetrafluoropropyl acetate (CF$_3$CClFCH$_2$OC(=O)CH$_3$) | 0.70 |
| 2,3,3,3-tetrafluoropropyl acetate | 0.42 |
| 2-chloro-2,3,3,3-tetrafluoropropoxy methyl acetate (CF$_3$CFClCH$_2$OCH$_2$OC(=O)CH$_3$) | 2.27 |
| Acetic anhydride | 12.4 |
| Pyridinyl ethanone | 15.58 |
| Dimethylacetamide | 3.00 |
| Unknowns | 7.49 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges, include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

What is claimed is:

1. A composition comprising HFO-1234yf and at least one additional compound selected from the group consisting of CFC-114a (2-dichloro-1,1,1,2-tetrafluoroethane, $CCl_2FCF_3$), HCFC-124 (2-chloro-1,1,1,2-tetrafluoroethane, $CF_3CHFCl$), HFC-143a (1,1,1-trifluoroethane, $CF_3H_3$), CFO-1113 (2-chloro-1,1,2-trifluoroethene, $CClF=CF_2$), HFO-1123 (1,1,2-trifluoroethene, $CHF=CF_2$), HFO-1132a (1,1-difluoroethene, $CH_2=CF_2$), TFE (tetrafluoroethene, $CF_2=CF_2$), HCFO-1122 (2-chloro-1,1-difluoroethene, $CHCl=CF_2$), 3,4,4,4-tetrafluoro-2-butanone ($CH_3C(=O)CHFCF_3$), acetyl fluoride ($CH_3C(=O)F$), 2-chloro-2,3,3,3-tetrafluoropropanol ($CF_3CClFCH_2OH$), 2-chloro-2,3,3,3-tetrafluoropropyl acetate ($CF_3CClFCH_2OC(=O)CH_3$), Zinc (2-chloro-2,3,3,3-tetrafluoropropoxy) chloride ($CF_3CClFCH_2OZnCl$), 2-chloro-2,3,3,3-tetrafluoropropoxy methyl acetate ($CF_3CFClCH_2OCH_2C(=O)CH_3$), 1,3-bistrifluoromethyl-1,3-difluorocyclobutane ($C_6H_4F_8$), 2,3,3,3-tetrafluoropropyl acetate ($CF_3CHFCH_2C(=O)CH_3$), dimethylformamide (DMF, $HCON(CH_3)_2$), pyridine ($C_5H_5N$), ethyl acetate ($CHClFCF_3$), acetic acid ($CH_3C(=O)OH$), diethyl ether ($CH_3CH_2OCH_2CH_3$), acetic anhydride ($CH_3C(=O)OC(=O)CH_3$), methyl acetate ($CH_3C(=O)OCH_3$), dimethylacetamide ($CH_3C(=O)N(CH_3)_2$), methanol ($CH_3OH$), ethanol $CH_3CH_2OH$), methyl formate ($HC(=O)OCH_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof; provided that the composition comprises HFC-143a, HFO-1123, CFO-1113, HCFC-124 and CFC-114a.

2. The composition of claim 1, wherein the additional compounds comprise methyl formate, acetic acid and 2,3,3,3-tetrafluoropropyl acetate.

3. The composition of claim 1, wherein the additional compounds comprise TFE, HFO-1123, HFC-143a, CFO-1113, HCFC-124, CFC-114a, 1,3-bis-trifluoromethyl-1,3-difluorocyclobutane, methyl formate, acetic acid, and 2,3,3,3-tetrafluoropropyl acetate.

4. The composition of claim 1, wherein the additional compounds comprise HFO-1123, water, CFO-1113, 1,3-bis-trifluoromethyl-1,3-difluorocyclobutane, methyl formate, and methyl acetate.

5. The composition of claim 1 wherein the composition is in the vapor phase, and the total amount of said compounds other than HFO-1234yf is about 30 weight percent, or less.

6. The composition of claim 5 wherein the composition contains less than 10 ppm HFO-1234ze.

7. A composition comprising:
a. at least one compound selected from $CF_3CClFCH_2OH$, $CF_3CClFCH_2OC(=O)CH_3$ and $CF_3CClFCH_2OZnCl$;
b. at least one solvent;
c. HFO-1234yf;
d. CFO-1113
e. HCFC-124;
f. HFO-1123; and
g. CFC-114a.

8. The composition of claim 7 comprising $CF_3CClFCH_2OH$ and further comprising at least one additional compound selected from the group consisting of HFO-1132a, TFE, HCFO-1122, dimethylacetamide, methanol, methyl acetate, methyl formate, DMF, pyridine, ethyl acetate, acetic acid, diethyl ether, $CF_3CClFCH_2OZnCl$, $CF_3CClFCH_2OC(=O)CH_3$, 2-chloro-2,3,3,3-tetrafluoropropoxy methyl acetate, and mixtures thereof.

9. The composition of claim 7 comprising $CF_3CClFCH_2OC(=O)CH_3$ and further comprising at least one additional compound selected from the group consisting of HFO-1132a, TFE, HCFO-1122, methanol, methyl acetate, methyl formate, dimethylacetamide, dimethylformamide, pyridine, ethyl acetate, acetic acid, diethyl ether, acetic anhydride, formaldehyde, 3-chloro-3,4,4,4-trifluoro-2-butanone, 2,3,3,3-tetrafluoropropyl acetate, $CF_3CClFCH_2OCH(=O)$, 2-chloro-2,3,3,3-tetrafluoropropoxy methyl acetate, $CF_3CClFCH_2OH$, $CF_3CClFCH_2OZnCl$, and mixtures thereof.

10. The composition of claim 7 comprising $CF_3CClFCH_2OZnCl$ and further comprising at least one additional compound selected from the group consisting of HFO-1132a, TFE, HCFO-1122, methanol, methyl acetate, methyl formate, dimethylacetamide, dimethylformamide, pyridine, ethyl acetate, acetic acid, diethyl ether, formaldehyde, trifluoroacetaldehyde, $CF_3CClFCH_2OH$, $CF_3CClFCH_2C(=O)CH_3$, 2-chloro-2,3,3,3-tetrafluoropropoxy methyl acetate ($CF_3CFClCH_2OCH_2OC(=O)CH_3$), and mixtures thereof.

11. The composition claim 7, 8, 9 or 10 comprising methyl formate and acetic acid.

12. The composition of claim 9 comprising methyl formate, acetic acid and 2,3,3,3-tetrafluoropropyl acetate.

13. The composition of claim 7 wherein said solvent is selected from the group consisting of alkyl, dialkyl, or trialkyl linear or cylic amines; pyridine or alkyl-substituted pyridines, pyrazine, pyrimidine; sulfoxides, ethers, alkyl or aromatic nitriles, hexamethylphosphoramide; alcohols; esters, dimethylformamide, tetrahydrofuran, dimethylacetamide, 1,4-dioxane, and N-methylpyrrolidone, and mixtures thereof.

14. The composition of claim 13 wherein said solvent is selected from the group consisting of methanol, ethanol, methyl formate, DMSO, acetonitrile, benzonitrile, and mixtures thereof.

15. The composition of claim 13 wherein said solvent is selected from the group consisting of dimethylacetamide, dimethylformamide, pyridine, and mixtures thereof.

16. A composition comprising HFO-1234yf and at least one additional compound selected from the group consisting of CFC-114a (2-dichloro-1,1,1,2-tetrafluoroethane, $CCl_2FCF_3$), HCFC-124 (2-chloro-1,1,1,2-tetrafluoroethane, $CF_3CHFCl$), HFC-143a (1,1,1-trifluoroethane, $CF_3CH_3$), CFO-1113 (2-chloro-1,1,2-trifluoroethene, $CClF=CF_2$), HFO-1123 (1,1,2-trifluoroethene, CHF=CF$_2$), HFO-1132a (1,1-difluoroethene, CH$_2$=CF$_2$), TFE (tetrafluoroethene, CF$_2$=CF$_2$), HCFO-1122 (2-chloro-1,1-difluoroethene, CHCl=CF$_2$), 3,4,4,4-tetrafluoro-2-butanone (CH$_3$C(=O)CHFCF$_3$), acetyl fluoride (CH$_3$C(=O)F), 2-chloro-2,3,3,3-tetrafluoropropanol (CF$_3$CClFCH$_2$OH), 2-chloro-2,3,3,3-tetrafluoropropyl acetate (CH$_3$CClFCH$_2$OC(=O)CH$_3$), Zinc (2-chloro-2,3,3,3-tetrafluoropropoxy) chloride (CF$_3$CClFCH$_2$OZnCl), 2-chloro-2,3,3,3-tetrafluoropropoxy methyl acetate (CF$_3$CFClCH$_2$OCH$_2$OC(=O)CH$_3$), 1,3-bis-trifluoromethyl-1,3-difluorocyclobutane (C$_6$H$_4$F$_8$), 2,3,3,3-tetrafluoropropyl acetate (CF$_3$CHFCH$_2$OC(=O)CH$_3$), dimethylformamide (DMF, HCON(CH$_3$)$_2$), pyridine (C$_5$H$_5$N), ethyl acetate, (CHClFCF$_3$), acetic acid (CH$_3$C(=O)OH), diethyl ether (CH$_3$CH$_2$OCH$_2$CH$_3$), acetic anhydride (CH$_3$C(=O)OC(=O)CH$_3$), methyl acetate (CH$_3$C(=O)OCH$_3$), dimethylacetamide (CH$_3$C(=O)N(CH$_3$)$_2$), methanol (CH$_3$OH), ethanol CH3CH2OH), methyl formate (HC(=O)OCH$_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof; provided that the composition comprises CFO-1113; and that the composition contains greater than zero weight percent to less than 1 weight percent of the at least one additional compound.

17. The composition of claim 16 comprising HCFO-1122 (2-chloro-1,1-difluoroethene, CHCl=CF$_2$).

18. The composition of claim 17 comprising HCFC-124 (2-chloro-1,1,1,2-tetrafluoroethane, CF$_3$CHFCl).

19. The composition of claim 16 comprising HCFC-124 (2-chloro-1,1,1,2-tetrafluoroethane, CF$_3$CHFCl).

20. The composition of claim 19 wherein the additional compounds comprise TFE, HFO-1123, HFC-143a, HCFC-124, CFC-114a, 1,3-bis-trifluoromethyl-1,3-difluorocyclobutane, methyl formate, acetic acid, and 2,3,3,3-tetrafluoropropyl acetate.

21. The composition of claim 19 wherein the additional compounds comprise HFO-1123, water, 1,3-bis-trifluoromethyl-1,3-difluorocyclobutane, methyl formate, and methyl acetate.

22. A composition comprising HFO-1234yf and at least one additional compound selected from the group consisting of CFC-114a (2-dichloro-1,1,1,2-tetrafluoroethane, CCl$_2$FCF$_3$), HCFC-124 (2-chloro-1,1,1,2-tetrafluoroethane, CF$_3$CHFCl), HFC-143a (1,1,1-trifluoroethane, CF$_3$CH$_3$), CFO-1113 (2-chloro-1,1,2-trifluoroethene, CClF=CF$_2$), HFO-1123 (1,1,2-trifluoroethene, CHF=CF$_2$), HFO-1132a (1,1-difluoroethene, CH=CF$_2$), TFE (tetrafluoroethene, CF$_2$=CF$_2$), HCFO-1122 (2-chloro-1,1-difluoroethene, CHCl=CF$_2$), 3,4,4,4-tetrafluoro-2-butanone (CH$_3$C(=O)CHFCF$_3$), acetyl fluoride (CH$_3$C(=O)F), 2-chloro-2,3,3,3-tetrafluoropropanol (CF$_3$CClFCH$_2$OH), 2-chloro-2,3,3,3-tetrafluoropropyl acetate (CF$_3$CClFCH$_2$OC(=O)CH$_3$), Zinc (2-chloro-2,3,3,3-tetrafluoropropoxy) chloride (CF$_3$CClFCH$_2$OZnCl), 2-chloro-2,3,3,3-tetrafluoropropoxy methyl acetate (CF$_3$CFClCH$_2$OCH$_2$OC(=O)CH$_3$), 1,3-bis-trifluoromethyl-1,3-difluorocyclobutane (C$_6$H$_4$F$_8$), 2,3,3,3-tetrafluoropropyl acetate (CF$_3$CHFCH$_2$OC(=O)CH$_3$), dimethylformamide (DMF, HCON(CH$_3$)$_2$), pyridine(C$_5$H$_5$N), ethyl acetate, (CHClFCF$_3$), acetic acid (CH$_3$C(=O)OH, diethyl ether (CH$_3$CH$_2$OCH$_2$CH$_3$), acetic anhydride (CH$_3$C(=O)OC(=O)CH$_3$), methyl acetate (CH$_3$C(=O)OCH$_3$), dimethylacetamide (CH$_3$C(=O)N(CH$_3$)$_2$), methanol (CH$_3$OH), ethanol CH3CH2OH), methyl formate (HC(=O)OCH$_3$), pyrazine, pyrimidine, N-methylpyrrolidine, N-methylpiperidine, hexamethylphosphoramide, tetrahydrofuran, 1,4-dioxane, N-methylpyrrolidinone, dimethyl sulfoxide, acetonitrile, benzonitrile, and mixtures thereof; provided that the additional compounds comprise CFO-1113, tetrafluoroethene, 1,1,difluoroethene, trifluoroethene and 2-chloro-1,1,1,2-tetrafluoroethane (HCFC-124).

* * * * *

UNITED STATES PATENT AND TRADEMARK OFFICE
CERTIFICATE OF CORRECTION

| | |
|---|---|
| PATENT NO. | : 8,147,710 B2 |
| APPLICATION NO. | : 12/576388 |
| DATED | : April 3, 2012 |
| INVENTOR(S) | : Mario Joseph Nappa et al. |

It is certified that error appears in the above-identified patent and that said Letters Patent is hereby corrected as shown below:

In the Claims:

Column 25: Claim 1, line 54, in place of "composition comprises HFC-143a, HFO-1123, CFO-1113," should appear --composition comprises 2,3,3,3-tetrafluoropropyl acetate, HFC-143a, HFO-1123, CFO-1113,--

Column 25: Claim 2, lines 57-58, in place of "compounds comprise methyl formate, acetic acid and 2,3,3,3-tetrafluoropropyl acetate." should appear --compounds comprise acetic acid and methyl formate.--

Column 26: Claim 16, line 23, in place of "the composition comprises CFO-1113; and that the composition" should appear --the composition comprises 2,3,3,3-tetrafluoropropyl acetate and CFO-1113; and that the composition--

Column 28: Claim 22, line 33, in place of "the additional compounds comprise CFO-1113, tetrafluoroethene," should appear --the additional compounds comprise 2,3,3,3-tetrafluoropropyl acetate, CFO-1113, tetrafluoroethene,--

Signed and Sealed this
Twenty-first Day of May, 2013

Teresa Stanek Rea
*Acting Director of the United States Patent and Trademark Office*